US012732437B2

(12) United States Patent
Yan et al.

(10) Patent No.: US 12,732,437 B2
(45) Date of Patent: Sep. 8, 2026

(54) METHOD AND APPARATUS FOR RESOLVING INTENT CONFLICT

(71) Applicant: Huawei Technologies Co., Ltd., Shenzhen (CN)

(72) Inventors: Wen Yan, Shanghai (CN); Xianming Li, Shanghai (CN); Yijun Yu, Dongguan (CN); Yinping Liu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 49 days.

(21) Appl. No.: 18/756,859

(22) Filed: Jun. 27, 2024

(65) Prior Publication Data

US 2024/0356821 A1 Oct. 24, 2024

Related U.S. Application Data

(63) Continuation of application No. PCT/CN2022/141383, filed on Dec. 23, 2022.

(30) Foreign Application Priority Data

Dec. 29, 2021 (CN) ......................... 202111639903.0

(51) Int. Cl.
*H04L 41/00* (2022.01)
*G06F 16/22* (2019.01)
(Continued)

(52) U.S. Cl.
CPC ...... *H04L 41/5009* (2013.01); *H04L 41/0894* (2022.05)

(58) Field of Classification Search
CPC . H04L 41/5009; H04L 41/0894; H04L 41/00; G06F 16/22
(Continued)

(56) References Cited

U.S. PATENT DOCUMENTS

| | | | | |
|---|---|---|---|---|
| 11,283,691 | B1 * | 3/2022 | A | H04L 63/02 |
| 2018/0358001 | A1 * | 12/2018 | Amid | G06F 16/3329 |
| 2020/0178093 | A1 * | 6/2020 | Peng | H04W 36/00838 |

FOREIGN PATENT DOCUMENTS

| | | | |
|---|---|---|---|
| CN | 113825128 | A | 12/2021 |
| WO | 2021093782 | A1 | 5/2021 |
| WO | 2021169838 | A1 | 9/2021 |

OTHER PUBLICATIONS

ETSI GR ENI 008 V2.1.1, (Mar. 2021), "Experiential Networked Intelligence (ENI); InTent Aware Network Autonomicity (ITANA)", total 26 pages.

(Continued)

*Primary Examiner* — Jude Jean Gilles
(74) *Attorney, Agent, or Firm* — Slater Matsil, LLP

(57) ABSTRACT

Embodiments of this application provide a method and an apparatus for resolving an intent conflict that includes: receiving conflict resolution policy information indicating a threshold and a first operation, the first operation includes: when a first preset condition is met, using an alternative solution for achieving a first intent, where the first preset condition includes that a first impact value of a value that is of a first KPI and that corresponds to the solution for a value that is of the first KPI and that corresponds to a second intent target is less than or equal to the threshold; and performing conflict resolution on the solution based on the conflict resolution policy information.

20 Claims, 5 Drawing Sheets

(51) Int. Cl.
*H04L 41/0894* (2022.01)
*H04L 41/5009* (2022.01)

(58) Field of Classification Search
USPC .......................................................... 709/224
See application file for complete search history.

(56) References Cited

OTHER PUBLICATIONS

3GPP TS 28.312 V0.4.0, (Mar. 2021), "3rd Generation Partnership Project; Technical Specification Group Services and System Aspects; Management and orchestration; Intent driven management services for mobile networks (Release 17)", total 21 pages.
3GPP TS 28.312 V0.6.0, (Oct. 2021), "3rd Generation Partnership Project; Technical Specification Group Services and System Aspects; Management and orchestration; Intent driven management services for mobile networks (Release 17)", total 27 pages.

* cited by examiner

Knowledge management network element

ID network element

Data collection coordination function network element

S421: First request information

S422: First response information

S423: Second request information

S424: Second response information

S425: Perform, based on the first response information and the second response information, re-estimation on a value that is of a first KPI and that corresponds to a solution, to obtain a re-estimated value S426: Determine a first re-estimated impact value of the re-estimated value for a value that is of the first KPI and that corresponds to a second intent target

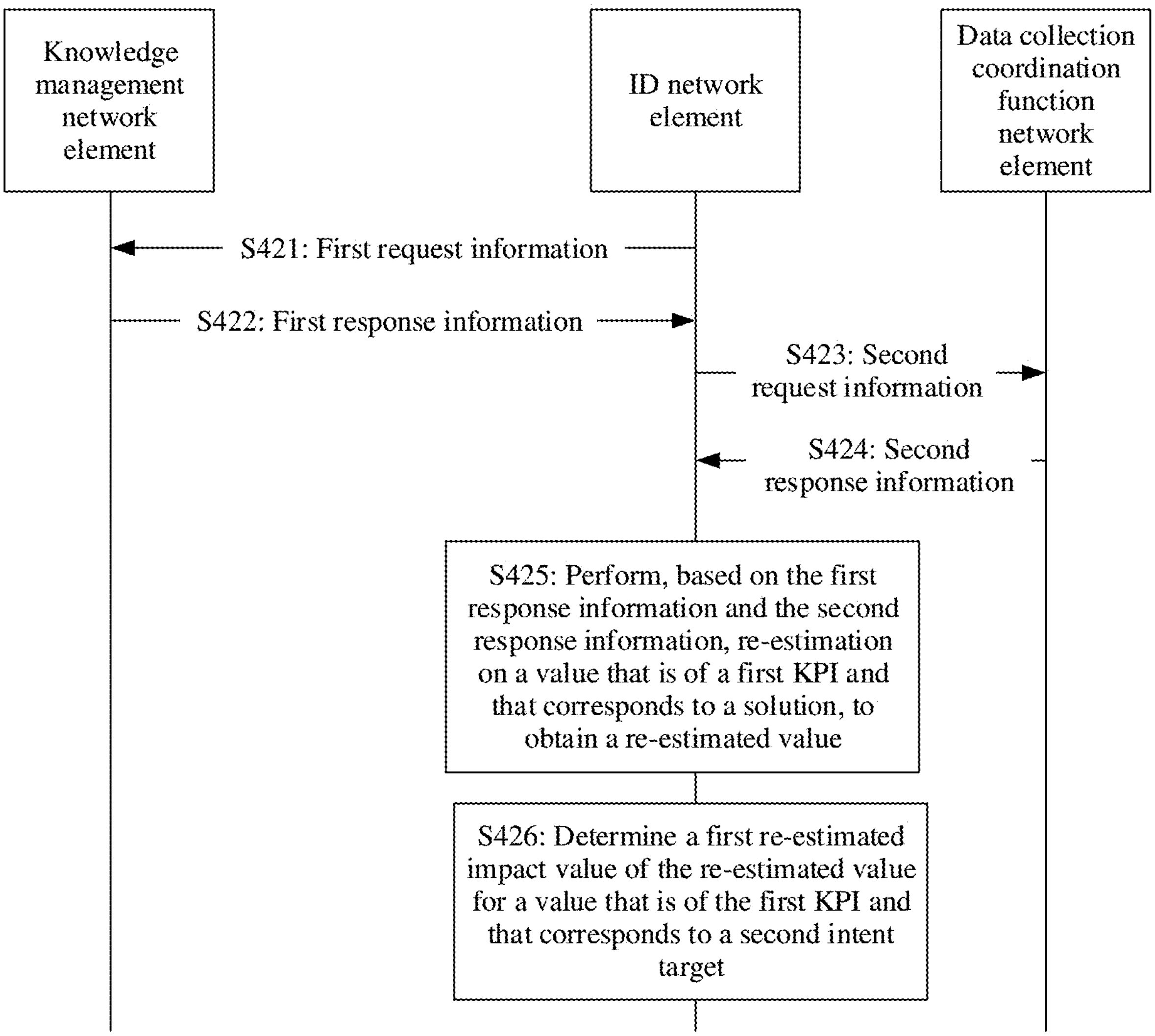

FIG. 6

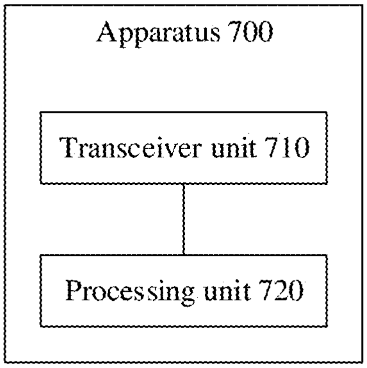

FIG. 7

METHOD AND APPARATUS FOR RESOLVING INTENT CONFLICT

CROSS-REFERENCE TO RELATED APPLICATIONS

This application is a continuation of International Application No. PCT/CN2022/141383, filed on Dec. 23, 2022, which claims priority to Chinese Patent Application No. 202111639903.0, filed on Dec. 29, 2021. The disclosures of the aforementioned applications are hereby incorporated by reference in their entireties.

TECHNICAL FIELD

Embodiments of this application relate to the field of wireless communication, and more specifically, to a method and an apparatus for resolving an intent conflict.

BACKGROUND

During network configuration and monitoring, a user may use a cognitive network management system that determines a behavior control mode based on an observation direction. The system uses an artificial intelligence (AI) technology and a context awareness policy to adjust a provided service based on changes of a user requirement, an environment condition, and a business objective. Therefore, the system can help the user automate work, to reduce an operating expense and improve network use and maintenance.

The user may create an intent in the system, to meet an expectation for the system. When creating the intent, the system generates a plurality of solutions and selects one solution from the plurality of solutions for execution, to satisfy an intent target (namely, a target value reached by the intent). However, in a process of implementing a plurality of intents, a created intent may conflict with an intent that is in an active state in the system. The system preferably selects, from a solution that does not affect achievement of another intent, a solution that can be for achieving the intent. If no solution is available, the system needs to retranslate the intent to generate a solution and perform conflict detection until the system can select the solution that does not affect achievement of the another intent. Consequently, the system needs to make a plurality of attempts such as retranslation to select the solution that does not affect achievement of the another intent. This wastes a large quantity of system resources and reduces execution efficiency of the intent.

SUMMARY

Embodiments of this application provide a method and an apparatus for resolving an intent conflict, to reduce a waste of a system resource, and improve execution efficiency of an intent.

According to a first aspect, a method for resolving an intent conflict is provided. The method may be performed by an intent providing network element or a chip or a circuit in an intent providing network element.

For example, more specifically, the method may be performed by an intent decision/execution (ID/IE) network element or an intent conflict resolution (ICR) network element in the intent providing network element, or may be performed by a chip or a circuit in an ID/IE network element or an ICR network element.

The intent conflict includes that a solution of a first intent affects a first key performance indicator KPI corresponding to a second intent target. The second intent target indicates a target value reached by a second intent.

The method includes: receiving conflict resolution policy information sent by an intent consumption network element, where the conflict resolution policy information indicates a threshold and a first operation, and the first operation includes: when a first preset condition is met, using the solution as an alternative solution for achieving the first intent, where the first preset condition includes that a first impact value of a value that is of the first KPI and that corresponds to the solution for a value that is of the first KPI and that corresponds to the second intent target is less than or equal to the threshold; and performing conflict resolution on the solution based on the conflict resolution policy information.

According to the foregoing technical solution, the solution is used, as the alternative solution for achieving the first intent, based on the conflict resolution policy information sent by the intent consumption network element, that is, when the first impact value of the value that is of the first KPI and that corresponds to the solution of the first intent for the value that is of the first KPI and that corresponds to the second intent target is less than or equal to the threshold. This can expand a solution selection range, without retranslating an intent to generate the solution and performing conflict detection, thereby reducing a waste of a system resource, and improving execution efficiency of the intent.

With reference to the first aspect, in some implementations of the first aspect, the conflict resolution policy information further includes an impact re-estimation policy and a second operation. The impact re-estimation policy indicates a policy of performing re-estimation on the first impact value. The second operation includes: when the first preset condition is not met, performing, based on a second KPI, re-estimation on the value that is of the first KPI and that corresponds to the solution, to obtain a re-estimated value, and when a second preset condition is met, using the solution as the alternative solution, where the second preset condition includes that a first re-estimated impact value of the re-estimated value for the value that is of the first KPI and that corresponds to the second intent target is less than or equal to the threshold, and the second KPI is a KPI that affects a value of the first KPI.

According to the foregoing technical solution, if a solution in which the first impact value of the value that is of the first KPI and that corresponds to the solution of the first intent for the value that is of the first KPI and that corresponds to the second intent target is less than or equal to the threshold cannot be found in the solution of the first intent based on the conflict resolution policy information sent by the intent consumption network element, impact of the second KPI on the value of the first KPI can be further considered and re-estimation can be performed on the value of the first KPI according to the impact re-estimation policy, to obtain the re-estimated value. When the first re-estimated impact value of the re-estimated value for the value that is of the first KPI and that corresponds to the second intent target is less than or equal to the threshold, the solution is used as the alternative solution for achieving the first intent. This can expand the solution selection range, without retranslating the intent to generate the solution and performing conflict detection, thereby reducing the waste of the system resource, and improving execution efficiency of the intent.

With reference to the first aspect, in some implementations of the first aspect, the method further includes: sending first request information to a knowledge management network element, where the first request information is for requesting a second impact value of the second KPI for the value that is of the first KPI and that corresponds to the solution; and receiving first response information that is sent by the knowledge management network element for the first request information, where the first response information indicates a plurality of mapping relationships, and the mapping relationships include a mapping relationship between a value corresponding to the second KPI and a plurality of second impact values. The performing, based on a second KPI, re-estimation on the value that is of the first KPI and that corresponds to the solution, to obtain a re-estimated value includes: performing, based on the plurality of mapping relationships and a truth value corresponding to the second KPI and according to the impact re-estimation policy, re-estimation on the value that is of the first KPI and that corresponds to the solution, to obtain the re-estimated value, where the truth value corresponding to the second KPI is a value corresponding to the second KPI in a current network status.

With reference to the first aspect, in some implementations of the first aspect, the method further includes: sending second request information to a data collection coordination function network element, where the second request information is for requesting the truth value corresponding to the second KPI; and receiving second response information that is sent by the data collection coordination function network element for the second request information, where the second response information indicates the truth value corresponding to the second KPI.

With reference to the first aspect, in some implementations of the first aspect, the impact re-estimation policy includes a downward re-estimation policy or an interpolation re-estimation policy. The downward re-estimation policy is re-estimation in a direction in which impact on the second intent target is small. A first intent target indicates a target value reached by the first intent. The interpolation re-estimation policy is re-estimation based on an interpolation method.

With reference to the first aspect, in some implementations of the first aspect, the conflict resolution policy information further includes a smallest impact indication policy. The smallest impact indication policy includes: When the second preset condition is not met, a solution with a smallest first re-estimated impact value in a plurality of solutions is used as the alternative solution.

According to the foregoing technical solution, if the solution in which the first impact value of the value that is of the first KPI and that corresponds to the solution of the first intent for the value that is of the first KPI and that corresponds to the second intent target is less than or equal to the threshold cannot be found in the solution of the first intent based on the conflict resolution policy information sent by the intent consumption network element, and further, a solution in which the first re-estimated impact value of the re-estimated value for the value that is of the first KPI and that corresponds to the second intent target is less than or equal to the threshold cannot be found either according to the impact re-estimation policy, the solution with the smallest first re-estimated impact value in the plurality of solutions can be used as the alternative solution. This can expand the solution selection range, without retranslating the intent to generate the solution and performing conflict detection, thereby reducing the waste of the system resource, and improving execution efficiency of the intent.

With reference to the first aspect, in some implementations of the first aspect, the conflict resolution policy information further includes a smallest impact indication policy. The smallest impact indication policy includes: When the first preset condition is not met, a solution with a smallest first impact value in a plurality of solutions is used as the alternative solution.

According to the foregoing technical solution, if a solution in which the first impact value of the value that is of the first KPI and that corresponds to the solution of the first intent for the value that is of the first KPI and that corresponds to the second intent target is less than or equal to the threshold cannot be found in the solution of the first intent based on the conflict resolution policy information sent by the intent consumption network element, the solution with the smallest first impact value in the plurality of solutions may be used as the alternative solution. This can expand the solution selection range, without retranslating the intent to generate the solution and performing conflict detection, thereby reducing the waste of the system resource, and improving execution efficiency of the intent.

With reference to the first aspect, in some implementations of the first aspect, the method further includes: determining that the intent conflict occurs; and sending third request information to the intent consumption network element, where the third request information is for requesting the conflict resolution policy information.

According to the foregoing technical solution, when determining that the intent conflict occurs, the intent providing network element requests the conflict resolution policy information from the intent consumption network element. This can save unnecessary signaling overheads.

With reference to the first aspect, in some implementations of the first aspect, the method further includes: adjusting the threshold based on reference information. The reference information includes a real-time margin of the first KPI. The real-time margin is a margin of the second intent target relative to a real-time truth value of the first KPI corresponding to the second intent in the current network status.

The threshold is adjusted based on the reference information. This can further expand the solution selection range, without retranslating the intent to generate the solution and performing conflict detection, thereby reducing the waste of the system resource, and improving execution efficiency of the intent.

With reference to the first aspect, in some implementations of the first aspect, the method further includes: sending third query information to the data collection coordination function network element, where the third query information is for requesting to query the real-time margin; and receiving third query response information sent by the data collection coordination function network element, where the third query response information indicates the real-time margin.

With reference to the first aspect, in some implementations of the first aspect, a larger real-time margin indicates a higher adjusted threshold; and/or the real-time margin is determined based on the real-time truth value of the first KPI corresponding to the second intent in the current network status and the target value corresponding to the second intent, or the real-time margin is determined based on the real-time truth value of the first KPI corresponding to the second intent in the current network status, the second intent target, and a prediction preference, and the prediction preference is a prediction preference for a real-time truth value of the first KPI.

According to a second aspect, a method for resolving an intent conflict is provided. The method may be performed by an intent providing network element or a chip or a circuit in an intent providing network element.

For example, more specifically, the method may be performed by an intent decision/execution (ID/IE) network element or an intent conflict resolution (ICR) network element in the intent providing network element, or may be performed by a chip or a circuit in an ID/IE network element or an ICR network element.

The intent conflict includes that a solution of a first intent affects a first key performance indicator KPI corresponding to a second intent target. The second intent target indicates a target value reached by a second intent.

The method includes: receiving conflict resolution policy information sent by an intent consumption network element, where the conflict resolution policy information indicates a threshold, an impact re-estimation policy, and a second operation; and performing conflict resolution on the solution based on the conflict resolution policy information. The impact re-estimation policy indicates a policy of performing re-estimation on a first impact value. The first impact value is an impact value of a value that is of the first KPI and that corresponds to the solution for a value that is of the first KPI and that corresponds to the second intent target. The second operation includes: performing, based on a second KPI, re-estimation on the value that is of the first KPI and that corresponds to the solution, to obtain a re-estimated value, and when a second preset condition is met, using the solution as an alternative solution of the first intent. The second preset condition includes that a first re-estimated impact value of the re-estimated value for the value that is of the first KPI and that corresponds to the second intent target is less than or equal to the threshold. The second KPI is a KPI related to a network status.

According to the foregoing technical solution, impact of the second KPI on a value of the first KPI can be considered and re-estimation can be performed on the value of the first KPI based on the conflict resolution policy information sent by the intent consumption network element and according to the impact re-estimation policy, to obtain the re-estimated value. When the first re-estimated impact value of the re-estimated value for the value that is of the first KPI and that corresponds to the second intent target is less than or equal to the threshold, the solution is used as the alternative solution for achieving the first intent. This can expand a solution selection range, without retranslating an intent to generate the solution and performing conflict detection, thereby reducing a waste of a system resource, and improving execution efficiency of the intent.

With reference to the second aspect, in some implementations of the second aspect, the method further includes: sending first request information to a knowledge management network element, where the first request information is for requesting a second impact value of the second KPI for the value that is of the first KPI and that corresponds to the solution; and receiving first response information that is sent by the knowledge management network element for the first request information, where the first response information indicates a plurality of mapping relationships, and the mapping relationships include a mapping relationship between a value corresponding to the second KPI and a plurality of second impact values. The performing, based on a second KPI, re-estimation on the value that is of the first KPI and that corresponds to the solution, to obtain a re-estimated value includes: performing, based on the plurality of mapping relationships and a truth value corresponding to the second KPI and according to the impact re-estimation policy, re-estimation on the value that is of the first KPI and that corresponds to the solution, to obtain the re-estimated value, where the truth value corresponding to the second KPI is a value corresponding to the second KPI in a current network status.

With reference to the second aspect, in some implementations of the second aspect, the method further includes: sending second request information to a data collection coordination function network element, where the second request information is for requesting the truth value corresponding to the second KPI; and receiving second response information that is sent by the data collection coordination function network element for the second request information, where the second response information indicates the truth value corresponding to the second KPI.

With reference to the second aspect, in some implementations of the second aspect, the impact re-estimation policy includes a downward re-estimation policy or an interpolation re-estimation policy. The downward re-estimation policy is re-estimation in a direction in which impact on the second intent target is small. A first intent target indicates a target value reached by the first intent. The interpolation re-estimation policy is re-estimation based on an interpolation method.

With reference to the second aspect, in some implementations of the second aspect, the conflict resolution policy information further includes a smallest impact indication policy. The smallest impact indication policy includes: When the second preset condition is not met, a solution with a smallest first re-estimated impact value in a plurality of solutions is used as the alternative solution.

According to the foregoing technical solution, if a solution in which the first impact value of the re-estimated value for the value that is of the first KPI and that corresponds to the second intent target is less than or equal to the threshold cannot be found in the solution of the first intent, the solution with the smallest first re-estimated impact value in the plurality of solutions can be used as the alternative solution based on the conflict resolution policy information sent by the intent consumption network element. This can expand the solution selection range, without retranslating the intent to generate the solution and performing conflict detection, thereby reducing the waste of the system resource, and improving execution efficiency of the intent.

With reference to the second aspect, in some implementations of the second aspect, the method further includes: determining that the intent conflict occurs; and sending third request information to the intent consumption network element, where the third request information is for requesting the conflict resolution policy information.

According to the foregoing technical solution, when determining that the intent conflict occurs, the intent providing network element requests the conflict resolution policy information from the intent consumption network element. This can save unnecessary signaling overheads.

With reference to the second aspect, in some implementations of the second aspect, the method further includes: adjusting the threshold based on reference information. The reference information includes a real-time margin of the first KPI. The real-time margin is a margin of the second intent target relative to a real-time truth value of the first KPI corresponding to the second intent in the current network status.

The threshold is adjusted based on the reference information. This can further expand the solution selection range, without retranslating the intent to generate the solution and performing conflict detection, thereby reducing the waste of the system resource, and improving execution efficiency of the intent.

With reference to the second aspect, in some implementations of the second aspect, the method further includes: sending third query information to the data collection coordination function network element, where the third query information is for requesting to query the real-time margin; and receiving third query response information sent by the data collection coordination function network element, where the third query response information indicates the real-time margin.

With reference to the second aspect, in some implementations of the second aspect, a larger real-time margin indicates a higher adjusted threshold; and/or the real-time margin is determined based on the real-time truth value of the first KPI corresponding to the second intent in the current network status and the target value corresponding to the second intent, or the real-time margin is determined based on the real-time truth value of the first KPI corresponding to the second intent in the current network status, the second intent target, and a prediction preference, and the prediction preference is a prediction preference for a real-time truth value of the first KPI.

According to a third aspect, a method for resolving an intent conflict is provided. The method may be performed by an intent providing network element or a chip or a circuit in an intent providing network element.

For example, more specifically, the method may be performed by an intent decision/execution (ID/IE) network element or an intent conflict resolution (ICR) network element in the intent providing network element, or may be performed by a chip or a circuit in an ID/IE network element or an ICR network element.

The intent conflict includes that a solution of a first intent affects a first key performance indicator KPI corresponding to a second intent target. The second intent target indicates a target value reached by a second intent.

The method includes: receiving conflict resolution policy information sent by an intent consumption network element, where the conflict resolution policy information indicates to use a solution with a smallest first impact value in a plurality of solutions as an alternative solution for achieving the first intent, and the first impact value is an impact value of a value that is of the first KPI and that corresponds to the solution for a value that is of the first KPI and that corresponds to the second intent target; and performing conflict resolution on the solution based on the conflict resolution policy information.

According to the foregoing technical solution, the solution with the smallest first impact value in the plurality of solutions can be used as the alternative solution based on the conflict resolution policy information sent by the intent consumption network element. This can expand a solution selection range, without retranslating an intent to generate the solution and performing conflict detection, thereby reducing a waste of a system resource, and improving execution efficiency of the intent.

With reference to the third aspect, in some implementations of the third aspect, the method further includes: determining that the intent conflict occurs; and sending third request information to the intent consumption network element, where the third request information is for requesting the conflict resolution policy information.

According to a fourth aspect, an apparatus for resolving an intent conflict is provided. The apparatus may be an intent providing network element or a chip or a circuit in an intent providing network element.

The intent conflict includes that a solution of a first intent affects a first key performance indicator KPI corresponding to a second intent target. The second intent target indicates a target value reached by a second intent.

The apparatus includes: a transceiver unit, configured to receive conflict resolution policy information sent by an intent consumption network element, where the conflict resolution policy information indicates a threshold and a first operation, and the first operation includes: when a first preset condition is met, using the solution as an alternative solution for achieving the first intent, where the first preset condition includes that a first impact value of a value that is of the first KPI and that corresponds to the solution for a value that is of the first KPI and that corresponds to the second intent target is less than or equal to the threshold; and a processing unit, configured to perform conflict resolution on the solution based on the conflict resolution policy information.

With reference to the fourth aspect, in some implementations of the fourth aspect, the conflict resolution policy information further includes an impact re-estimation policy and a second operation. The impact re-estimation policy indicates a policy of performing re-estimation on the first impact value. The second operation includes: when the first preset condition is not met, performing, based on a second KPI, re-estimation on the value that is of the first KPI and that corresponds to the solution, to obtain a re-estimated value, and when a second preset condition is met, using the solution as the alternative solution. The second preset condition includes that a first re-estimated impact value of the re-estimated value for the value that is of the first KPI and that corresponds to the second intent target is less than or equal to the threshold. The second KPI is a KPI that affects a value of the first KPI.

With reference to the fourth aspect, in some implementations of the fourth aspect, the transceiver unit is further configured to: send first request information to a knowledge management network element, where the first request information is for requesting a second impact value of the second KPI for the value that is of the first KPI and that corresponds to the solution; and receive first response information that is sent by the knowledge management network element for the first request information, where the first response information indicates a plurality of mapping relationships, and the mapping relationships include a mapping relationship between a value corresponding to the second KPI and a plurality of second impact values. The performing, based on a second KPI, re-estimation on the value that is of the first KPI and that corresponds to the solution, to obtain a re-estimated value includes: performing, based on the plurality of mapping relationships and a truth value corresponding to the second KPI and according to the impact re-estimation policy, re-estimation on the value that is of the first KPI and that corresponds to the solution, to obtain the re-estimated value, where the truth value corresponding to the second KPI is a value corresponding to the second KPI in a current network status.

With reference to the fourth aspect, in some implementations of the fourth aspect, the transceiver unit is further configured to: send second request information to a data collection coordination function network element, where the second request information is for requesting the truth value corresponding to the second KPI; and receive second response information that is sent by the data collection coordination function network element for the second request information, where the second response information indicates the truth value corresponding to the second KPI.

With reference to the fourth aspect, in some implementations of the fourth aspect, the impact re-estimation policy includes a downward re-estimation policy or an interpolation re-estimation policy. The downward re-estimation policy is re-estimation in a direction in which impact on the second intent target is small. A first intent target indicates a target value reached by the first intent. The interpolation re-estimation policy is re-estimation based on an interpolation method.

With reference to the fourth aspect, in some implementations of the fourth aspect, the conflict resolution policy information further includes a smallest impact indication policy. The smallest impact indication policy includes: When the second preset condition is not met, a solution with a smallest first re-estimated impact value in a plurality of solutions is used as the alternative solution.

With reference to the fourth aspect, in some implementations of the fourth aspect, the conflict resolution policy information further includes a smallest impact indication policy. The smallest impact indication policy includes: When the first preset condition is not met, a solution with a smallest first impact value in a plurality of solutions is used as the alternative solution.

With reference to the fourth aspect, in some implementations of the fourth aspect, the processing unit is further configured to determine that the intent conflict occurs. The transceiver unit is further configured to send third request information to the intent consumption network element. The third request information is for requesting the conflict resolution policy information.

With reference to the fourth aspect, in some implementations of the fourth aspect, the processing unit is further configured to adjust the threshold based on reference information. The reference information includes a real-time margin of the first KPI. The real-time margin is a margin of the second intent target relative to a real-time truth value of the first KPI corresponding to the second intent in the current network status.

The threshold is adjusted based on the reference information. This can further expand a solution selection range, without retranslating an intent to generate the solution and performing conflict detection, thereby reducing a waste of a system resource, and improving execution efficiency of the intent.

With reference to the fourth aspect, in some implementations of the fourth aspect, the transceiver unit is further configured to: send third query information to the data collection coordination function network element, where the third query information is for requesting to query the real-time margin; and receive third query response information sent by the data collection coordination function network element, where the third query response information indicates the real-time margin.

With reference to the fourth aspect, in some implementations of the fourth aspect, a larger real-time margin indicates a higher adjusted threshold; and/or the real-time margin is determined based on the real-time truth value of the first KPI corresponding to the second intent in the current network status and the target value corresponding to the second intent, or the real-time margin is determined based on the real-time truth value of the first KPI corresponding to the second intent in the current network status, the second intent target, and a prediction preference, and the prediction preference is a prediction preference for a real-time truth value of the first KPI.

According to a fifth aspect, an apparatus for resolving an intent conflict is provided. The apparatus may be an intent providing network element or a chip or a circuit in an intent providing network element.

The intent conflict includes that a solution of a first intent affects a first key performance indicator KPI corresponding to a second intent target. The second intent target indicates a target value reached by a second intent.

The apparatus includes: a transceiver unit, configured to receive conflict resolution policy information sent by an intent consumption network element, where the conflict resolution policy information indicates a threshold, an impact re-estimation policy, and a second operation; and a processing unit, configured to perform conflict resolution on the solution based on the conflict resolution policy information. The impact re-estimation policy indicates a policy of performing re-estimation on a first impact value. The first impact value is an impact value of a value that is of the first KPI and that corresponds to the solution for a value that is of the first KPI and that corresponds to the second intent target. The second operation includes: performing, based on a second KPI, re-estimation on the value that is of the first KPI and that corresponds to the solution, to obtain a re-estimated value, and when a second preset condition is met, using the solution as an alternative solution of the first intent. The second preset condition includes that a first re-estimated impact value of the re-estimated value for the value that is of the first KPI and that corresponds to the second intent target is less than or equal to the threshold. The second KPI is a KPI related to a network status.

With reference to the fifth aspect, in some implementations of the fifth aspect, the transceiver unit is further configured to: send first request information to a knowledge management network element, where the first request information is for requesting a second impact value of the second KPI for the value that is of the first KPI and that corresponds to the solution; and receive first response information that is sent by the knowledge management network element for the first request information, where the first response information indicates a plurality of mapping relationships, and the mapping relationships include a mapping relationship between a value corresponding to the second KPI and a plurality of second impact values. The performing, based on a second KPI, re-estimation on the value that is of the first KPI and that corresponds to the solution, to obtain a re-estimated value includes: performing, based on the plurality of mapping relationships and a truth value corresponding to the second KPI and according to the impact re-estimation policy, re-estimation on the value that is of the first KPI and that corresponds to the solution, to obtain the re-estimated value, where the truth value corresponding to the second KPI is a value corresponding to the second KPI in a current network status.

With reference to the fifth aspect, in some implementations of the fifth aspect, the transceiver unit is further configured to: send second request information to a data collection coordination function network element, where the second request information is for requesting the truth value corresponding to the second KPI; and receive second response information that is sent by the data collection coordination function network element for the second request information, where the second response information indicates the truth value corresponding to the second KPI.

With reference to the fifth aspect, in some implementations of the fifth aspect, the impact re-estimation policy includes a downward re-estimation policy or an interpolation re-estimation policy. The downward re-estimation policy is re-estimation in a direction in which impact on the second intent target is small. A first intent target indicates a target value reached by the first intent. The interpolation re-estimation policy is re-estimation based on an interpolation method.

With reference to the fifth aspect, in some implementations of the fifth aspect, the conflict resolution policy information further includes a smallest impact indication policy. The smallest impact indication policy includes: When the second preset condition is not met, a solution with a smallest first re-estimated impact value in a plurality of solutions is used as the alternative solution.

With reference to the fifth aspect, in some implementations of the fifth aspect, the processing unit is further configured to determine that the intent conflict occurs. The transceiver unit is further configured to send third request information to the intent consumption network element. The third request information is for requesting the conflict resolution policy information.

With reference to the fifth aspect, in some implementations of the fifth aspect, the processing unit is further configured to adjust the threshold based on reference information. The reference information includes a real-time margin of the first KPI. The real-time margin is a margin of the second intent target relative to a real-time truth value of the first KPI corresponding to the second intent in the current network status.

The threshold is adjusted based on the reference information. This can further expand a solution selection range, without retranslating an intent to generate the solution and performing conflict detection, thereby reducing a waste of a system resource, and improving execution efficiency of the intent.

With reference to the fifth aspect, in some implementations of the fifth aspect, the transceiver unit is further configured to: send third query information to the data collection coordination function network element, where the third query information is for requesting to query the real-time margin; and receive third query response information sent by the data collection coordination function network element, where the third query response information indicates the real-time margin.

With reference to the fifth aspect, in some implementations of the fifth aspect, a larger real-time margin indicates a higher adjusted threshold; and/or the real-time margin is determined based on the real-time truth value of the first KPI corresponding to the second intent in the current network status and the target value corresponding to the second intent, or the real-time margin is determined based on the real-time truth value of the first KPI corresponding to the second intent in the current network status, the second intent target, and a prediction preference, and the prediction preference is a prediction preference for a real-time truth value of the first KPI.

According to a sixth aspect, an apparatus for resolving an intent conflict is provided. The apparatus may be an intent providing network element or a chip or a circuit in an intent providing network element.

The intent conflict includes that a solution of a first intent affects a first key performance indicator KPI corresponding to a second intent target. The second intent target indicates a target value reached by a second intent.

The apparatus includes: a transceiver unit, configured to receive conflict resolution policy information sent by an intent consumption network element, where the conflict resolution policy information indicates to use a solution with a smallest first impact value in a plurality of solutions as an alternative solution for achieving the first intent, and the first impact value is an impact value of a value that is of the first KPI and that corresponds to the solution for a value that is of the first KPI and that corresponds to the second intent target; and a processing unit, configured to perform conflict resolution on the solution based on the conflict resolution policy information.

With reference to the sixth aspect, in some implementations of the sixth aspect, the processing unit is further configured to determine that the intent conflict occurs. The transceiver unit is further configured to send third request information to the intent consumption network element. The third request information is for requesting the conflict resolution policy information.

According to a seventh aspect, an apparatus for resolving an intent conflict is provided. The apparatus is configured to perform the method according to any possible implementation of the first aspect to the third aspect. Specifically, the apparatus may include a unit and/or a module, for example, a processing unit and/or a transceiver unit, configured to perform the method according to any possible implementation of the first aspect to the third aspect.

In an implementation, the apparatus is an intent providing network element. When the apparatus is the intent providing network element, the transceiver unit may be a transceiver or an input/output interface, and the processing unit may be at least one processor. Optionally, the transceiver may be a transceiver circuit. Optionally, the input/output interface may be an input/output circuit.

In another implementation, the apparatus is a chip, a chip system, or a circuit configured in an intent providing network element. When the apparatus is the chip, the chip system, or the circuit configured in the intent providing network element, the transceiver unit may be an input/output interface, an interface circuit, an output circuit, an input circuit, a pin, a related circuit, or the like on the chip, the chip system, or the circuit. The processing unit may be at least one processor, a processing circuit, a logic circuit, or the like.

According to an eighth aspect, an apparatus for resolving an intent conflict includes at least one processor. The at least one processor is configured to execute a computer program stored in a memory, to enable the apparatus to implement the method according to any possible implementation of the first aspect to the third aspect.

In an implementation, the apparatus is an intent providing network element.

In another implementation, the apparatus is a chip, a chip system, or a circuit configured in an intent providing network element.

According to a ninth aspect, a computer-readable storage medium is provided, including a computer program. When the computer program is run on a computer, the computer is enabled to perform the method according to any possible implementation of the first aspect to the third aspect.

According to a tenth aspect, a chip system is provided, including: a processor, configured to invoke a computer program from a memory and run the computer program, to enable a device, on which the chip system is mounted, to perform the method according to any possible implementation of the first aspect to the third aspect.

Optionally, in an implementation, the chip further includes a memory. The memory stores a computer program or instructions. The processor is configured to execute the computer program or the instructions stored in the memory. When the computer program or the instructions are executed, the processor is configured to perform the communication method according to any possible implementation of the first aspect to the ninth aspect.

According to an eleventh aspect, a processor is provided, configured to perform the method according to any possible implementation of the first aspect to the third aspect.

Operations such as sending and obtaining/receiving related to the processor may be understood as operations such as output and receiving or input of the processor, or operations such as sending and receiving performed by a radio frequency circuit and an antenna, unless otherwise specified, or provided that the operations do not contradict actual functions or internal logic of the operations in related descriptions. This is not limited in this application.

According to a twelfth aspect, a computer program product is provided. The computer program product includes a computer program (which may also be referred to as code or instructions). When the computer program is run, a computer is enabled to perform the method according to any possible implementation of the first aspect to the third aspect.

According to a thirteenth aspect, a communication system is provided, including an intent providing network element and an intent consumption network element. The intent providing network element is configured to perform the method according to any possible implementation of the first aspect to the third aspect.

BRIEF DESCRIPTION OF THE DRAWINGS

FIG. 6 is a schematic flowchart of obtaining a first re-estimated impact value according to an embodiment of this application; and FIG. 7 and FIG. 8 are diagrams of structures of apparatuses for resolving an intent conflict according to embodiments of this application.

DETAILED DESCRIPTION OF ILLUSTRATIVE EMBODIMENTS

The following describes the technical solutions in embodiments of this application with reference to the accompanying drawings.

Figure 1:
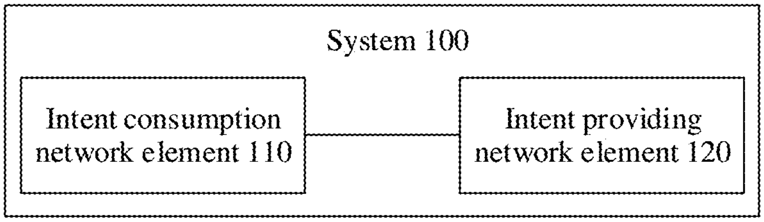
FIG. 1 to FIG. 3 are diagrams of a system applicable to intent resolution according to an embodiment of this application.

FIG. 1 is a diagram of a system 100 applicable to a method according to an embodiment of this application. As shown in FIG. 1, the system 100 includes an intent consumption network element 110 and an intent providing network element 120. The intent consumption network element 110 may also be referred to as an intent consumer, and is a consumption subject of an intent. The intent consumption network element 110 may communicate with the intent providing network element 120. For example, the intent consumption network element 110 may send, to the intent providing network element 120, a request for creating the intent or implementing the intent. Accordingly, the intent providing network element 120 may receive the request for creating the intent or implementing the intent sent by the intent consumption network element 110.

A specific architecture of the system 100 is not limited in embodiments of this application. For example, the system 100 may include various network function virtualization (NFV) systems. The system may describe, as modes and policies in a standard formal language, a current business technical solution, a network construction solution, and a network operation and maintenance method of an operator, and implement the technical solution and the construction solution based on these modes and policies.

For example, the system 100 may be one of the following systems: a wireless intent driven network (wIDN) system, an experiential networked intelligence (ENI) system, an intent driven management service (IDMS) system, an open network automation platform (ONAP) system, and the like.

Figure 2:
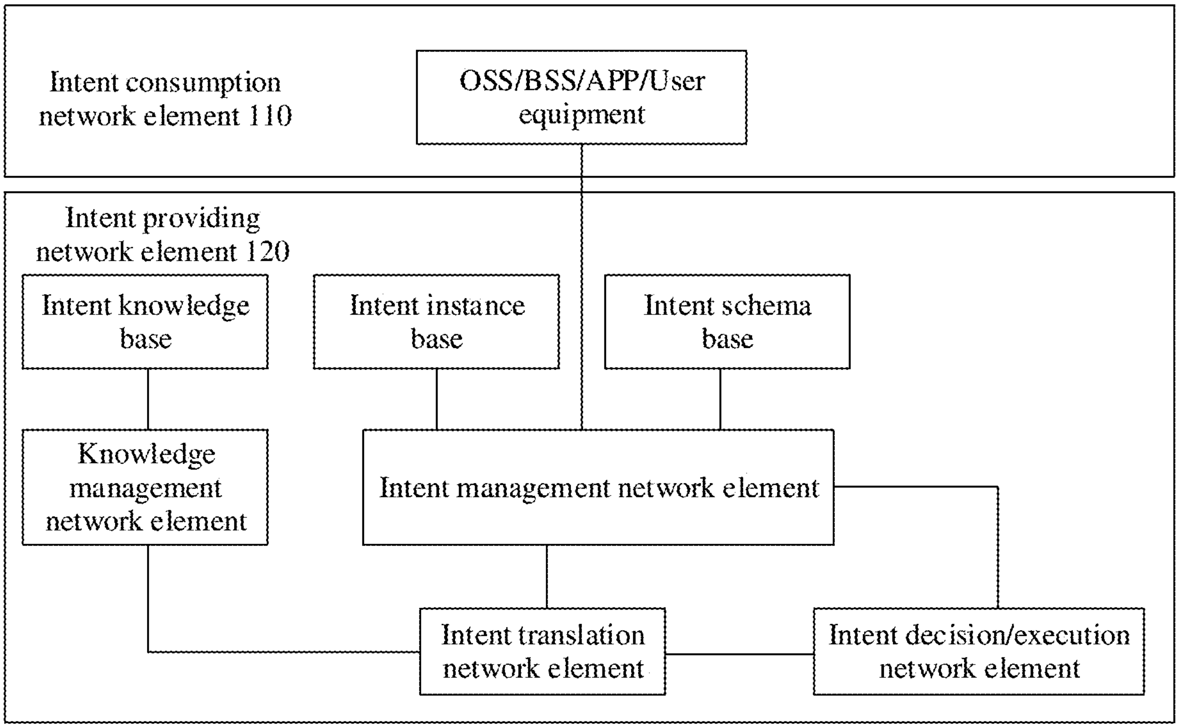
Figure 3:
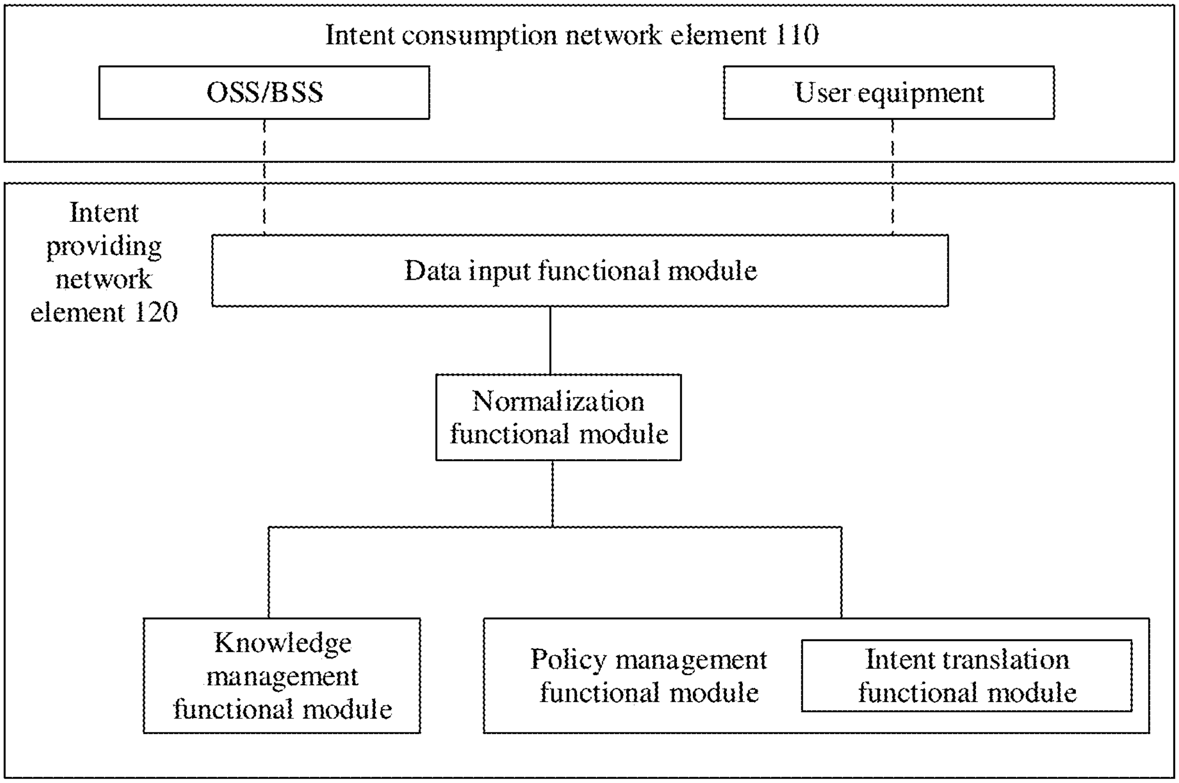

With reference to FIG. 2 and FIG. 3, the following describes an architecture of the system 100 by using the system 100 being the wIDN system or the ENI system. FIG. 2 is a diagram of an architecture of the wIDN system applicable to the method according to an embodiment of this application. FIG. 3 is a diagram of an architecture of the ENI system applicable to the method according to an embodiment of this application.

It should be noted that FIG. 2 and FIG. 3 are merely two diagrams of the system 100, and should not constitute a limitation on the system 100. For example, the systems shown in FIG. 2 and FIG. 3 may further include other network elements or modules that are not shown. For another example, network elements or modules included in the system shown in FIG. 2 and/or the system shown in FIG. 3 may be separately disposed, or may be integrated into one or more network elements or modules.

For example, as shown in FIG. 2 and FIG. 3, the intent consumption network element 110 may be an operations support system (OSS), a business support system (BSS), an application (APP), or other user equipment.

For example, as shown in FIG. 2, the intent providing network element 120 may include an intent translation (IT) network element, an ID/IE network element, a knowledge management (KM) network element, an intent management network element, an intent knowledge base, an intent instance base, and an intent schema base.

The intent translation network element may receive translation request information from the intent management network element, to implement an intent translation function. The intent translation network element may further obtain an intent schema from the intent management network element, and perform syntax and semantic check on information provided by the intent consumption network element.

An intent decision/execution network element may receive commands from the intent management network element and the intent translation network element, and implement intent-related operations.

The knowledge management network element is configured to manage intent knowledge.

The intent management network element may be configured to manage the intent schema. The intent management network element may receive request information from the intent consumption network element 110, and process the request information.

The intent knowledge base is for storing the intent knowledge.

Optionally, in some embodiments, the intent knowledge base shown in FIG. 2 may be set in the knowledge management network element.

The intent instance base is for storing the intent.

The intent schema base is for storing the intent schema.

Optionally, in some embodiments, the intent instance base/the intent schema base shown in FIG. 2 may be set in the intent management network element. In this case, the intent management network element may obtain, by using the intent instance base, status information of the intent schema, an intent target, and an operation corresponding to the intent.

It should be noted that each network element shown in FIG. 2 may also be referred to as a module/device/unit. This is not limited in embodiments of this application. The foregoing module may also be referred to as a network element/device/unit. This is not limited in embodiments of this application.

For example, as shown in FIG. 3, the intent providing network element 120 may include a knowledge management functional module, a policy management functional module, a normalization functional module, and a data input functional module.

The knowledge management functional module is responsible for analyzing an existing network status and storing intent knowledge and intent context knowledge.

Optionally, in some embodiments, the knowledge management functional module shown in FIG. 3 may be disposed in an analysis functional module. In this case, the analysis functional module may be further provided with a context awareness functional module and a cognition management functional module. The knowledge management functional module may manage the intent knowledge. The context awareness functional module may perform awareness analysis on the existing network status. The cognition management functional module may perform management analysis.

The policy management functional module is configured to manage an intent policy. A translation functional module may be disposed in the policy management functional module. The translation functional module is configured to translate a received intent policy into a command that can be identified inside the ENI system.

The data input functional module is configured to receive data from an external system. The normalization functional module is configured to perform an operation like normalization processing on data.

Optionally, in some embodiments, the intent providing network element 120 shown in FIG. 3 may further include a situation awareness functional module and a driven management functional module. The situation awareness functional module is configured to perform awareness analysis on a network status. The driven management functional module is configured to perform intent driven management.

Optionally, in some embodiments, the intent providing network element 120 shown in FIG. 3 may further include an output function management function and a denormalization management function that are for converting an internal command of the system into a command in a format in which the external system can process the command, and sending the command to the external system.

It should be noted that each module shown in FIG. 3 may also be referred to as a network element/device/unit. This is not limited in embodiments of this application. For ease of description in the following, the network element is collectively used for description.

For the IDMS system, the intent consumption network element 110 may be a service or management service (MnS) consumer, for example, a network management system (NMS). The intent providing network element 120 may be a service or management service (MnS) producer device, for example, a management system (EMS).

It should be noted that, in some embodiments, an MnS consumer may also be referred to as an IDMS consumer. The MnS provider (producer) may also be referred to as an IDMS provider (producer).

It should be noted that the solutions in this application may be applied to another system including the corresponding network elements. This is not limited in this application.

For ease of understanding of embodiments of this application, the following first describes terms in embodiments of this application.

An intent means an expectation for an intent-applied system. The intent may include one or more of the following: a requirement, an intent target, and a constraint.

An intent expression is an expression that is for bearing an intent. The expression includes one or more of the following: an intent action name, an intent action attribute, an intent-applied object name, and an intent-applied object attribute. The intent expression has specific syntax and semantics.

An intent target indicates a target value that needs to be reached by an intent.

Intent translation is a procedure of translating an intent into an intent-executable command, a rule, or a sub-intent.

Intent execution means delivering an intent-executable command, a sub-intent, or a rule, and adjusting the intent-executable command, the sub-intent, or the rule based on a network environment and an intent achievement status.

An intent-executable command is a series of instructions formed by performing operations such as translation and decision on an intent.

An intent schema specifies syntax and semantics of an intent expression. The intent schema may include one or more of the following: a field, a value range of the field, a type of the field, and a hierarchical relationship between fields. For example, the field may be for describing a type, a name, or a consumer of the intent schema.

An intent status includes an activated state, a conflict state, a deactivated state, a sleep state, or the like. That an intent is in the activated state may be understood as that the intent is being executed. That an intent is in the conflict state may be understood as that the intent conflicts with an intent in a system. That an intent is in the deactivated state may be understood as that the intent is not executed. That an intent is in the sleep state may be understood as that execution of the intent is temporarily stopped because an intent target of the intent is not achieved for a long time.

Intent creation means creating an intent in an intent system and creating a corresponding intent context.

Intent knowledge is a related parameter of an intent schema stored in an intent knowledge base. For example, the related parameter may include one or more of the following: an executable operation corresponding to an intent, an intent-applied entity identifier, and an intent-applied entity type.

An intent knowledge base is a data base that is for storing expert experience and intent knowledge required for translation.

Intent achievement means that an intent system detects that a value corresponding to a key performance indicator (KPI) in a network reaches a target value in an intent expression. An intent operation is an executable operation corresponding to an intent target.

Intent conflict: When two intents cannot be achieved at the same time due to mutual exclusion of intent expressions, executable operations, execution results, or semantics, it means that the two intents conflict. Optionally, the intent conflict may be a conflict between an intent that needs to be created and an intent in an activated state in a system.

For example, the intent conflict may include a syntax conflict, an operation conflict, and an effect conflict.

The syntax conflict may be a conflict at a syntax level. For example, an inherent conflict between internal interpretations of intent targets is difficult to identify at levels of an intent expression and an intent execution operation, and is a deeper conflict between intents.

The operation conflict may be a conflict at an operation level. For example, two intents conflict in executable operations (intent operations) obtained through translation. To be specific, the operations of the two intents cannot be performed at the same time.

The effect conflict may be a conflict at an effect level. For example, achievement of an intent affects a KPI corresponding to another intent target, and then affects achievement of another intent.

When the effect conflict occurs, the system preferably selects, from a solution that does not affect achievement of the another intent, a solution that can be for achieving the intent. If no solution is available, the system needs to retranslate the intent to generate a solution and perform conflict detection until the system can select the solution that does not affect achievement of the another intent. Consequently, the system needs to make a plurality of attempts such as retranslation to select the solution that does not affect achievement of the another intent. This wastes a large quantity of system resources and reduces execution efficiency of the intent.

Therefore, embodiments of this application provide a method for resolving an intent conflict, to reduce a waste of a system resource, and improve execution efficiency of an intent.

For example, an execution body of the method for resolving an intent conflict is not limited in embodiments of this application, and may be any module related to the intent. For example, the execution body of the method for resolving an intent conflict may be the intent providing network element 120. More specifically, for example, the execution body of method for resolving an intent conflict may be the ID/IE network element in the intent providing network element 120 shown in FIG. 2, or the policy management functional module in the intent providing network element 120 shown in FIG. 3, or the MnS provider in the IDMS system.

Optionally, in some embodiments, if an ICR network element/module is disposed in the intent providing network element 120, the execution body of the method for resolving an intent conflict may be the ICR network element.

With reference to the accompanying drawings, the following describes in detail the method for resolving an intent conflict provided in embodiments of this application.

Figure 4:
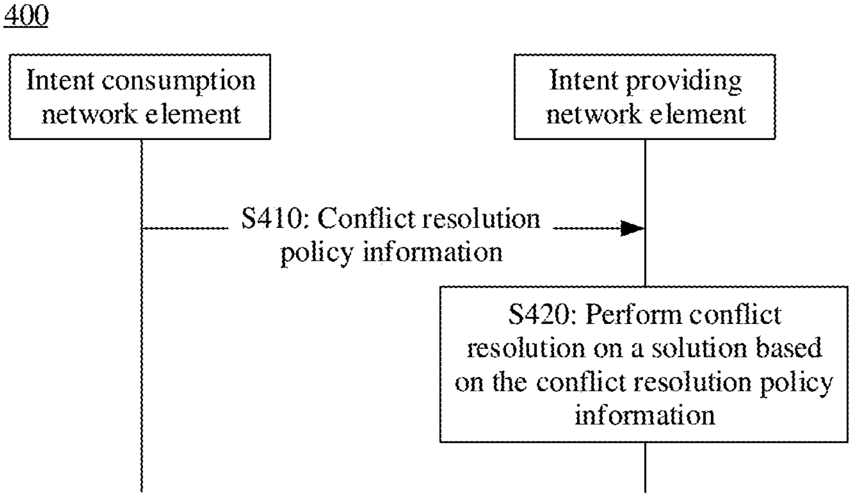
FIG. 4 is a schematic flowchart of a method for resolving an intent conflict according to an embodiment of this application.

FIG. 4 shows a method 400 for resolving an intent conflict according to an embodiment of this application.

As shown in FIG. 4, the method 400 includes the following steps.

S410: An intent consumption network element sends conflict resolution policy information to an intent providing network element. Correspondingly, the intent providing network element receives the conflict resolution policy information sent by the intent consumption network element.

The following uses Case 1 to Case 6 as examples to describe in detail content specifically indicated by the conflict resolution policy information.

Case 1: The conflict resolution policy information indicates only a threshold and a first operation.

The first operation includes: when a first preset condition is met, using a solution as an alternative solution for achieving a first intent. The first preset condition includes that a first impact value of a value that is of a first KPI and that corresponds to the solution for a value that is of the first KPI and that corresponds to a second intent target is less than or equal to a threshold.

The solution may be understood as a solution of the first intent. The solution affects the first key performance indicator KPI corresponding to the second intent target. The second intent target indicates a target value reached by a second intent. To be specific, there is an effect conflict between the solution of the first intent and the second intent.

The solution of the first intent in embodiments of this application may be understood as a solution generated after the first intent is translated. The solution of the first intent, namely, the solution generated after the first intent is translated, includes two solutions: one solution that can achieve the first intent and the other solution that cannot achieve the first intent. It should be noted that, in embodiments of this application, that the solution is used as the alternative solution for achieving the first intent in the conflict resolution policy information may be understood as follows: A solution that has an intent conflict with the second intent in the solution of the first intent is used as the alternative solution for achieving the first intent, or a solution that can achieve the first intent in the solution of the first intent and that has an intent conflict with the second intent is used as the alternative solution for achieving the first intent. The following provides descriptions by using an example in which the solution that has the intent conflict with the second intent in the solution of the first intent is used as the alternative solution for achieving the first intent.

The first KPI is also a target KPI corresponding to the second intent target.

For example, the first intent may be to ensure that an average downlink cell delay is not greater than 10 ms, and the second intent may be to ensure that an average downlink cell throughput is greater than 8 Mbps. In this case, a first intent target, namely, a target value reached by the first intent, is 10 ms, and a target KPI corresponding to the first intent target is a delay. The second intent target, namely, the target value reached by the second intent, is 8 Mbps. The target KPI corresponding to the second intent target is a throughput. After translating the first intent, the intent providing network element generates some solutions that enable an average downlink cell delay not to be greater than 10 ms. In these solutions, implementation of some solutions may affect a value of the target KPI, for example, the throughput, corresponding to the second intent target. In this case, the throughput is the first KPI.

A form of the threshold is not limited in embodiments of this application. For example, the threshold may be an absolute value or a relative value of impact of a value that is of the first KPI and that corresponds to the solution on a value that is of the first KPI and that corresponds to the second intent target.

In some embodiments, to execute a first intent with a higher priority as much as possible, the threshold may be set based on a priority of the first intent.

For example, a higher priority of the first intent indicates a higher threshold. In this way, there is a high probability that a solution corresponding to the first intent with the high priority is used as the alternative solution.

For example, the threshold may be preset with reference to experience.

Case 2: The conflict resolution policy information indicates only a threshold, an impact re-estimation policy, and a second operation.

The second operation includes: performing, based on a second KPI, re-estimation on a value that is of the first KPI and that corresponds to the solution, to obtain a re-estimated value, and when a second preset condition is met, using a solution as an alternative solution of the first intent.

The second preset condition includes that a first re-estimated impact value of the re-estimated value for a value that is of a first KPI and that corresponds to a second intent target is less than or equal to the threshold.

The second KPI is a KPI related to a network status. The second KPI affects a value of the first KPI. To be specific, impact on the value of the first KPI varies with a value of the second KPI.

For example, if downlink cell physical resource block (physical resource block, PRB) utilization is 10%, it is predicted that impact on an average downlink cell throughput decreases by 15%, and if downlink cell PRB utilization is 20%, it is predicted that impact on an average downlink cell throughput decreases by 20%. It can be learned that PRB utilization affects the average downlink cell throughput. In this case, it may be considered that a throughput is the first KPI, and the PRB utilization is the second KPI.

The impact re-estimation policy indicates a policy of performing re-estimation on a first impact value.

The first impact value is the same as the first impact value described in Case 1. Details are not described herein again.

A specific form of the impact re-estimation policy is not limited in embodiments of this application.

For example, the impact re-estimation policy includes a downward re-estimation policy or an interpolation re-estimation policy.

The downward re-estimation policy is re-estimation in a direction in which impact on the second intent target is small, namely, re-estimation performed in a direction in which it is more conducive to achieving the second intent target. For example, if a second intent may be to ensure that the average downlink cell throughput is greater than 8 Mbps, the downward re-estimation policy is re-estimation in a direction in which impact on the downlink cell throughput is less.

The interpolation re-estimation policy is re-estimation based on an interpolation method.

It should be noted that, that the impact re-estimation policy indicates the policy of performing re-estimation on the first impact value may be understood as follows: The impact re-estimation policy indicates a re-estimation policy for the value of the second KPI. However, the second KPI affects the value of the first KPI. Therefore, a value of the first KPI corresponding to an estimated value of the value of the second KPI is the re-estimated value in the second operation. The first re-estimated impact value may be obtained based on the re-estimated value. Then, re-estimation on the first impact value is implemented.

A form of an interpolation algorithm in the interpolation method is not limited in embodiments of this application. For example, the interpolation algorithm may be linear interpolation or non-linear interpolation.

Case 3: The conflict resolution policy information indicates only a smallest impact indication policy.

The smallest impact indication policy is to use a solution with a smallest first impact value in a plurality of solutions as an alternative solution for achieving the first intent.

The first impact value is the same as the first impact value in Case 1. Details are not described herein again.

Case 4: The conflict policy information indicates a threshold, a first operation, an impact re-estimation policy, and a second operation.

The threshold and the first operation are the same as the threshold and the first operation that are described in Case 1. Details are not described herein again.

The impact re-estimation policy is the same as the impact re-estimation policy described in Case 2. Details are not described herein again.

There is a difference between the second operation and the second operation described in Case 2. In this case, the second operation includes: when a first preset condition is not met, performing, based on a second KPI, re-estimation on a value that is of the first KPI and that corresponds to a solution, to obtain a re-estimated value, and when a second preset condition is met, using the solution as an alternative solution.

In Case 4, conflict resolution is first performed based on the threshold, that is, whether the first preset condition is met is determined. Then, the impact re-estimation policy is used only when the first preset condition is not met, to perform conflict resolution.

The first preset condition is the same as the first preset condition described in Case 1. Details are not described herein again. The second preset condition is the same as the second preset condition described in Case 2. Details are not described herein again.

Case 5: The conflict policy information indicates a threshold, a first operation, and a smallest impact indication policy.

The threshold and the first operation are the same as the threshold and the first operation that are described in Case 1. Details are not described herein again.

The smallest impact indication policy is the same as the smallest impact indication policy described in Case 3. Details are not described herein again.

In Case 5, conflict resolution is first performed based on the threshold, that is, whether a first preset condition is met is determined. Then, the smallest impact indication policy is used only when a first preset condition is not met, to perform conflict resolution.

Case 6: The conflict policy information indicates a threshold, a first operation, an impact re-estimation policy, a second operation, and a smallest impact indication policy.

The threshold and the first operation are the same as the threshold and the first operation that are described in Case 1. Details are not described herein again.

The impact re-estimation policy and the second operation are the same as the threshold and the second operation that are described in Case 4. Details are not described herein again.

The smallest impact indication policy includes: When a second preset condition is not met, a solution with a smallest first re-estimated impact value in a plurality of solutions is used as an alternative solution.

In Case 6, conflict resolution is first performed based on the threshold, that is, whether a first preset condition is met is determined. Then, the impact re-estimation policy is used only when the first preset condition is not met, to perform conflict resolution, that is, whether a second preset condition is met is determined. Finally, when the second preset condition is not met, conflict resolution is performed by using the smallest impact indication policy.

In some embodiments, the intent consumption network element may serve as an active party to actively send the conflict resolution policy information to the intent providing network element.

In some other embodiments, the intent consumption network element may serve as a passive party. The intent consumption network element sends the conflict resolution policy information to the intent providing network element only when the intent providing network element requests the conflict resolution policy information.

For example, when the intent providing network element determines that the intent conflict occurs, the intent providing network element may send third request information to the intent consumption network element. The third request information is for requesting the conflict resolution policy information. Then, the intent consumption network element sends the conflict resolution policy information to the intent providing network element. In this way, when determining that the intent conflict occurs, the intent providing network element requests the conflict resolution policy information from the intent consumption network element. This can save unnecessary signaling overheads.

It should be noted that, in an example, determining that the intent conflict occurs may be understood as determining that there is an effect conflict between the solution of the first intent and the second intent. In this case, that the solution is used as the alternative solution for achieving the first intent in the conflict resolution policy information may be understood as follows: The solution that has the intent conflict with the second intent in the solution of the first intent is used as the alternative solution for achieving the first intent. In another example, determining that the intent conflict occurs may alternatively be understood as determining that solutions for achieving the first intent all has an effect conflict with the second intent. In this case, that the solution is used as the alternative solution for achieving the first intent in the conflict resolution policy information may be understood as follows: A solution that has the intent conflict with the second intent in the solutions that can achieve the first intent in the solution of the first intent is used as the alternative solution for achieving the first intent. For example, if the intent providing network element includes an IT network element and an ID network element, an execution body of the method 400 is the ID network element. In an example, the intent consumption network element may send the conflict resolution policy information to the ID network element via the IT network element. Correspondingly, the ID network element may receive, via the IT network element, the conflict resolution policy information sent by the intent consumption network element. In other words, the intent consumption network element first sends the conflict resolution policy information to the IT network element, and then the IT network element forwards the conflict resolution policy information to the ID network element. In this example, if the intent consumption network element serves as the passive party to send the conflict resolution policy information to the intent providing network element, the ID network element may send the third request information to the intent consumption network element. Then, the intent consumption network element sends the conflict resolution policy information to the ID network element. In another example, the intent consumption network element may not send the conflict resolution policy information to the ID network element via an intermediate network element. Correspondingly, the ID network element may not receive, via the intermediate network element, the conflict resolution policy information sent by the intent consumption network element.

For example, if the intent providing network element includes an IT network element and an ICR network element, an execution body of the method 400 is the ICR network element. In an example, the intent consumption network element may send the conflict resolution policy information to the ICR network element via the IT network element. Correspondingly, the ICR network element may receive, via the IT network element, the conflict resolution policy information sent by the intent consumption network element. In other words, the intent consumption network element first sends the conflict resolution policy information to the IT network element, and then the IT network element forwards the conflict resolution policy information to the ICR network element. In this example, if the intent consumption network element serves as the passive party to send the conflict resolution policy information to the intent providing network element, the ICR network element may send the third request information to the intent consumption network element. Then, the intent consumption network element sends the conflict resolution policy information to the ICR network element. In another example, the intent consumption network element may not send the conflict resolution policy information to the ICR network element via an intermediate network element. Correspondingly, the ICR network element may not receive, via the intermediate network element, the conflict resolution policy information sent by the intent consumption network element.

It should be noted that a sequence of performing S410 and determining, by the intent providing network element, that the effect conflict occurs (denoted as S430) is not limited in embodiments of this application.

For example, S410 may be performed before S430. Alternatively, S410 may be performed after S430. Alternatively, S410 may be performed in a process of performing S430.

Optionally, in an embodiment in which S410 is performed after S430, when the intent providing network element determines that the effect conflict occurs, the intent providing network element may serve as the active party to first send the third request information to the intent consumption network element. The third request information is for requesting the conflict resolution policy information. When receiving the third request information, the intent consumption network element performs S410 and S420.

Optionally, when S410 is performed before S430, or when S410 is performed in the process of performing S430, the intent consumption network element may serve as the active party to perform S410. The intent providing network element performs S420 when determining that the effect conflict occurs.

Figure 5:
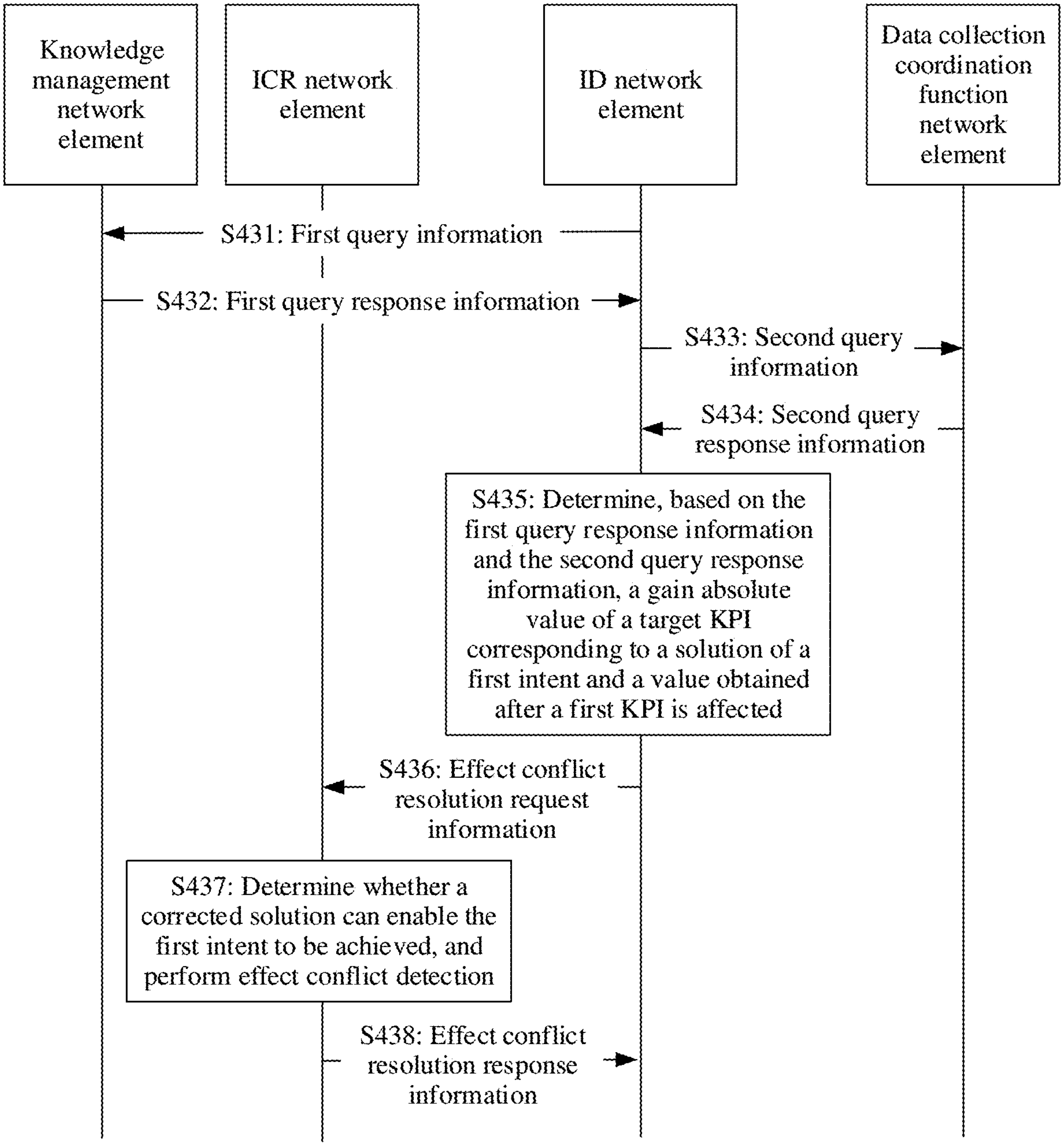
FIG. 5 is a schematic flowchart of determining that an effect conflict occurs according to an embodiment of this application.

The following describes S430 by using FIG. 5 as an example.

It should be noted that, in FIG. 5, both the ICR network element and the ID network element may be disposed in the intent providing network element.

FIG. 5 is an example flowchart of a specific process of S430 according to an embodiment of this application.

As shown in FIG. 5, S430 includes the following steps.

S431: The ID network element sends first query information to a knowledge management network element. Correspondingly, the knowledge management network element receives the first query information sent by the ID network element.

The first query information is for requesting to query a gain value of the target KPI corresponding to the solution of the first intent, which target KPI of another intent (for example, the second intent) is affected when the solution is implemented, and an impact value of impact on the target KPI of the another intent (for example, the second intent).

The first query information may include an identifier of the solution of the first intent. The identifier of the solution of the first intent identifies the solution.

A quantity of identifiers of the solution included in the first query information is not limited in embodiments of this application. In other words, there may be one or more identifiers of the solution included in the first query information. The following provides descriptions by using an example in which the first query information includes an identifier of one solution.

It should be noted that the gain value in embodiments of this application includes a positive gain value and a negative gain value. The positive gain value is a value of a gain in a direction that is conducive to achieving an intent target. In this case, the positive gain value of the target KPI corresponding to the solution of the first intent may be understood as a value of a gain in a direction that is conducive to achieving the first intent target. The negative gain value is a value of a gain in a direction that is not conducive to achieving the intent target. In this case, the negative gain value of the target KPI corresponding to the solution of the first intent may be understood as a value of a gain in a direction that is not conducive to achieving the first intent target.

For example, if the first intent is to ensure that the average downlink cell delay is not greater than 10 ms, the positive gain value of the target KPI corresponding to the solution of the first intent is a value of a gain in a direction in which the delay is less than 10 ms, and the negative gain value of the target KPI corresponding to the solution of the first intent is a value of a gain in a direction in which the delay is greater than 10 ms. If the first intent is to ensure that a load rate of a terminal device is greater than 10%, the positive gain value is a value of a gain in a direction in which the load rate is greater than 10%, and the negative gain value is a value of a gain in a direction in which the load rate is less than 10%.

It should be noted that the impact value in embodiments of this application includes a positive impact value and a negative impact value. The positive impact value is a value of impact in the direction that is conducive to achieving the intent target. In this case, a positive impact value of impact on the target KPI of the second intent generated when the solution of the first intent is implemented may be understood as a value of impact in the direction that is conducive to achieving the second intent target. The negative impact value is a value of impact in the direction that is not conducive to achieving the intent target. In this case, a negative impact value of impact on the target KPI of the second intent generated when the solution of the first intent is implemented may be understood as a value of impact in the direction that is not conducive to achieving the second intent target.

For example, if the second intent is to ensure that the average downlink cell throughput is greater than 8 Mbps, the positive impact value of the impact on the target KPI of the second intent generated when the solution of the first intent is implemented is a value of impact in a direction in which the average downlink cell throughput is greater than 8 Mbps. The negative impact value of the impact on the target KPI of the second intent generated when the solution of the first intent is implemented is a value of impact in a direction in which the average downlink cell throughput is less than 8 Mbps.

It should be noted that, for example, based on a requirement of a user (the intent consumption network element), the intent providing network element creates the first intent, translates and evaluates the first intent, and performs S431 when no solution that achieves the intent is selected in a solution that does not affect achievement of another intent.

S432: The knowledge management network element sends first query response information to the ID network element. Correspondingly, the ID network element receives the first query response information sent by the knowledge management network element.

The knowledge management network element stores a gain value of a target KPI corresponding to a solution of each intent, which target KPI of another intent is affected when the solution of each intent is implemented, and an impact value of impact on the target KPI of the another intent. In this case, after the knowledge management network element receives the first query response information, the knowledge management network element may find content that the first query response information is for requesting to query, then add the found content to the first query response information, and send the first query response information to the ID network element.

The first query response information includes the gain value of the target KPI corresponding to the solution of the first intent, impact of the solution of the first intent on the first KPI corresponding to the second intent target, and an impact value for the first KPI.

For example, as described in the foregoing example, if the first intent may be to ensure that the average downlink cell delay is not greater than 10 ms, the second intent may be to ensure that the average downlink cell throughput is greater than 8 Mbps, the target KPI corresponding to the first intent target is the delay, and the first KPI is the throughput. In this case, the first query response information includes a gain value of the delay, the throughput, and an impact value for the throughput.

A quantity of first KPIs is not limited in embodiments of this application. The following provides descriptions by using an example in which there is one first KPI.

Optionally, when there are two or more first KPIs, the first query response information may be fed back in a form of a list. For example, the list may include a correspondence between the gain value of the target KPI corresponding to the solution of the first intent, the first KPI, and the impact value for the first KPI.

For example, as described in the foregoing example, if the first intent may be to ensure that the average downlink cell delay is not greater than 10 ms, the second intent may be to ensure that the average downlink cell throughput is greater than 8 Mbps, the target KPI corresponding to the first intent target is the delay, and the first KPI is the throughput and the load rate. In this case, the first query response information includes a gain value of the delay, the throughput, an impact value for the throughput, the load rate, and an impact value for the load rate.

If the first query response information includes identifiers of the plurality of solutions, the first query response information includes a gain value of a target KPI corresponding to each solution of the first intent, impact of each solution of the first intent on a first KPI corresponding to another intent target, and an impact value for the first KPI.

Optionally, when the first query response information includes the identifiers of the plurality of solutions, the first query response information may be fed back in a form of a list. For example, the list may include a correspondence between an identifier of the solution of the first intent, the gain value of the target KPI corresponding to the solution, the first KPI, and the impact value for the first KPI.

S433: The ID network element sends second query information to a data collection coordination function (data collection coordination function, DCCF) network element. Correspondingly, the data collection coordination function network element receives the second query information sent by the ID network element.

The second query information is for requesting to query a truth value of the target KPI corresponding to the solution in a current network status and a truth value corresponding to the first KPI.

S434: The data collection coordination function network element sends second query response information to the ID network element. Correspondingly, the ID network element receives the second query response information sent by the data collection coordination function network element.

The second query response information includes the truth value of the target KPI corresponding to the solution in the current network status and the truth value corresponding to the first KPI.

S435: The ID network element determines, based on the first query response information and the second query response information, a gain absolute value of the target KPI corresponding to the solution of the first intent and a value obtained after the first KPI is affected.

Specifically, the ID network element calculates, based on the gain value of the target KPI corresponding to the solution of the first intent in the first query response information and the truth value of the target KPI corresponding to the solution in the current network status in the second query response information, the absolute value of the target KPI corresponding to the solution of the first intent.

For example, if the gain value of the target KPI (for example, the delay) corresponding to the solution of the first intent in the first query response information is-10%, and the truth value of the target KPI (for example, a delay) corresponding to the solution in the current network status in the second query response information is 11 ms, the absolute value of the target KPI (for example, the delay) corresponding to the solution of the first intent is 11+11×(−10%)=9.9 ms.

In addition, the ID network element calculates, based on the impact value for the first KPI in the first query response information and the truth value corresponding to the first KPI in the current network status in the second query response information, an absolute value corresponding to the first KPI.

For example, if the impact value for the first KPI (for example, the throughput) in the first query response information is −20%, and the truth value of the first KPI (for example, the throughput) in the current network status in the second query response information is 9 Mbps, the value obtained after the first KPI (for example, the throughput) is affected is 9+9×(−20%)=7.2 Mbit/s.

S436: The ID network element sends effect conflict resolution request information to the ICR network element. Correspondingly, the ICR network element receives the effect conflict resolution request information sent by the ID network element.

The effect conflict resolution request information is for requesting to determine whether a corrected solution can enable the first intent to be achieved and perform effect conflict detection on the corrected solution.

S437: Determine whether the corrected solution can enable the first intent to be achieved, and perform effect conflict detection.

If an absolute value of a target KPI corresponding to the corrected solution satisfies the first intent, it is considered that the corrected solution can enable the first intent to be achieved. If an absolute value of a target KPI corresponding to the corrected solution does not satisfy the first intent, it is considered that the solution cannot enable the first intent to be achieved.

For example, if the first intent may be to ensure that the average downlink cell delay is not greater than 10 ms, and an absolute value of a delay corresponding to the corrected solution is 9.9 ms, the corrected solution may enable the first intent to be achieved.

If the ICR network element determines that the value obtained after the first KPI is effect satisfies the second intent, it is considered that the corrected solution does not affect achievement of the second intent. If the ICR network element determines that the value obtained after the first KPI is effect does not satisfy the second intent, it is considered that the corrected solution affects achievement of the second intent.

For example, if the second intent is to ensure that the average downlink cell throughput is greater than 8 Mbps, the value obtained after the first KPI (for example, the throughput) is 7.2 Mbps, 7.2 Mbps is less than 8 Mbps, and the value obtained after the first KPI is affected does not satisfy the second intent, it is considered that the corrected solution affects achievement of the second intent.

When effect conflict detection occurs, the ICR further needs to calculate, based on the value obtained after the first KPI is affected and the value corresponding to the first KPI of the second intent, a first impact value of a value that is of the first KPI and that corresponds to the solution in the current network status for the value that is of the first KPI and that corresponds to the second intent target.

For example, if the second intent is to ensure that the average downlink cell throughput is greater than 8 Mbps, the value obtained after the first KPI (for example, the throughput) is affected is 7.2 Mbps. In this case, the first impact value of the value that is of the first KPI and that corresponds to the solution in the current network status for the value that is of the first KPI and that corresponds to the second intent target is (8-7.2)/8=10%.

Optionally, in some embodiments, S437 may be performed in two steps. In a first step, whether the corrected solution can enable the first intent to be achieved is determined. In a second step, effect conflict detection is performed.

S438: The ICR network element sends effect conflict resolution response information to the ID network element. Correspondingly, the ID network element receives the effect conflict resolution response information sent by the ICR network element.

The effect conflict resolution response information indicates whether the corrected solution can enable the first intent to be achieved and the first impact value.

Optionally, in some embodiments, the effect conflict resolution response information may further indicate an identifier of the second intent.

When the effect conflict resolution response information indicates that the corrected solution can enable the first intent to be achieved, the ID network element further needs to perform S420.

It should be noted that, in some embodiments, if the ICR network element and the ID network element are not disposed in the intent providing network element, all steps of interaction between the ICR network element and the ID network element in FIG. 5 are content performed by the intent providing network element. In addition, all steps of interaction between the ID network element, and the knowledge management network element and the data collection coordination function network element are steps of interaction between the intent providing network element, and the knowledge management network element and the data collection coordination function network element.

Optionally, in some embodiments, S431 and S432 may be steps of interaction between the ICR network element and the knowledge management network element. S433 and S434 may be steps of interaction between the ICR network element and the data collection coordination function network element. An execution body of S435 may be the ICR network element. In addition, S436 and S438 are not performed.

S420: The intent providing network element performs conflict resolution on the solution based on the conflict resolution policy information.

Specifically, the intent providing network element performs conflict resolution on the solution according to a policy included in the conflict resolution policy information.

Because the conflict resolution policy information specifically includes different content, a specific process of S420 is also different. The following continues to describe S420 in detail by using Case 1 to Case 6 as examples.

Case 1: The conflict resolution policy information indicates only the threshold and the first operation.

Specifically, when the first impact value is less than or equal to the threshold, that is, the first preset condition is met, the solution is used as the alternative solution for achieving the first intent. When the first impact value is greater than the threshold, that is, the first preset condition is not meet, the solution does not need to be used as the alternative solution for achieving the first intent. For example, the solution may be discarded.

For example, if the first impact value is 10%, the threshold in the conflict resolution policy information is 12%. Because 10% is less than 12%, and the first preset condition is met, the modified solution may be used as the alternative solution for achieving the first intent.

The solution is used, as the alternative solution for achieving the first intent, when the first impact value of the value that is of the first KPI and that corresponds to the solution of the first intent for the value that is of the first KPI and that corresponds to the second intent target is less than or equal to the threshold. This can expand a solution selection range, without retranslating an intent to generate the solution and performing conflict detection, thereby reducing a waste of a system resource, and improving execution efficiency of the intent.

Case 2: The conflict resolution policy information indicates only the threshold, the impact re-estimation policy, and the second operation.

In Case 2, the intent providing network element needs to obtain the first re-estimated impact value.

FIG. 6 is a schematic flowchart of a specific process of obtaining the first re-estimated impact value according to an embodiment of this application. As shown in FIG. 6, the intent providing network element further needs to perform the following steps.

S421: The ID network element sends first request information to the knowledge management network element. Correspondingly, the knowledge management network element receives the first request information sent by the ID network element.

The first request information is for requesting a second impact value of the second KPI for the value that is of the first KPI and that corresponds to the solution.

The knowledge management network element stores a relationship between a value corresponding to the second KPI and an impact value of the value corresponding to the second KPI for the value of the first KPI.

A quantity of relationships between the value corresponding to the second KPI and the impact value of the value corresponding to the second KPI for the value of the first KPI is not limited in embodiments of this application.

For example, the knowledge management network element stores the following: When the downlink cell PRB utilization (an example of the second KPI) is 10%, it is predicted that the impact on the average downlink cell throughput (an example of the first KPI) decreases by 15%. When the downlink cell PRB utilization is 20%, it is predicted that the average downlink cell throughput decreases by 20%. It can be learned that the PRB utilization affects the average downlink cell throughput.

S422: The ID network element receives first response information that is sent by the knowledge management network element for the first request information. Correspondingly, the ID network element receives the first response information sent by the knowledge management network element.

The first response information indicates a plurality of mapping relationships. The mapping relationships include a mapping relationship between the value corresponding to the second KPI and a plurality of second impact values.

A specific form in which the plurality of mapping relationships are carried in the first response information is not limited in embodiments of this application. For example, the plurality of mapping relationships may be carried in the first response information in a form of a list.

S423: The ID network element sends second request information to the data collection coordination function network element. Correspondingly, the data collection coordination function network element receives the second request information sent by the ID network element.

The second request information is for requesting a truth value corresponding to the second KPI. The truth value corresponding to the second KPI may be understood as a value corresponding to the second KPI in the current network status.

S424: The data collection coordination function network element sends, to the ID network element, second response information for the second request information. Correspondingly, the ID network element receives the second response information sent by the data collection coordination function network element.

The second response information indicates the truth value corresponding to the second KPI.

S425: The ID network element performs, based on the first response information and the second response information, re-estimation on the value that is of the first KPI and that corresponds to the solution, to obtain the re-estimated value.

Specifically, the value that is of the first KPI and that corresponds to the solution is re-estimated based on the plurality of mapping relationships and the truth value corresponding to the second KPI and according to the impact re-estimation policy, to obtain the re-estimated value.

For example, the plurality of mapping relationships in the first response information include a first mapping relationship and a second mapping relationship. The first mapping relationship is as follows: When the downlink cell PRB utilization (the example of the second KPI) is 10%, it is predicted that the impact on the average downlink cell throughput (the example of the first KPI) decreases by 15%. The second mapping relationship is as follows: When the downlink cell PRB utilization is 20%, it is predicted that the impact on the average downlink cell throughput decreases by 20%. The truth value corresponding to the second KPI in the second response information is 12%.

In this case, re-estimation is performed on the value of the second KPI according to the downward re-estimation policy, namely, in the direction in which the impact on the second intent target is small. In other words, re-estimation is performed on the value of the second KPI in the direction in which it is more conducive to achieving the second intent target.

For example, if the second intent is to ensure that the average downlink cell throughput is greater than 8 Mbps, it may be considered that a direction in which the impact on the average downlink cell throughput is small is a direction in which the impact on the second intent target is small. If the truth value of the first KPI (for example, the throughput) in the current network status in the second query response information in S434 is 9 Mbps, in the first mapping relationship and the second mapping relationship, that the impact on the average downlink cell throughput (the example of the first KPI) decreases by 15% is predicted based on the first mapping relationship is the direction in which the impact on the second intent target is small. In this case, a throughput re-estimated value may be $9+9\times(-15\%)=7.65$ Mbps.

In this case, the following may be obtained according to a linear interpolation re-estimation policy and based on the first mapping relationship and the second mapping relationship: If a positive change of the downlink cell PRB utilization is 10%, it is predicted that the impact on the average downlink cell throughput decreases by a positive change that is 5%. In this case, when the positive change of the downlink cell PRB utilization is 1%, it is predicted that the impact on the average downlink cell throughput decreases by a positive change that is 0.5%. In this way, when the truth value corresponding to the second KPI in the second response information is 12%, it is predicted that the impact on the average downlink cell throughput decreases by $15\%+(12-10)\times0.5\%=16\%$. The throughput re-estimated value may be $9+9\times(-16\%)=7.56$ Mbps if the truth value of the first KPI (for example, the throughput) in the current network status in the second query response information in S434 is 9 Mbps.

S426: Determine the first re-estimated impact value of the re-estimated value for the value that is of the first KPI and that corresponds to the second intent target.

For example, if the second intent is to ensure that the average downlink cell throughput is greater than 8 Mbps, the value obtained after the first KPI (for example, the throughput) is affected, namely, the re-estimated value, is 7.65 Mbps. In this case, a first re-estimated impact value of the value that is of the first KPI and that corresponds to the solution in the current network status for the value that is of the first KPI and that corresponds to the second intent target is $(8-7.65)/8\approx4.375\%$.

For another example, if the second intent is to ensure that the average downlink cell throughput is greater than 8 Mbps, the value obtained after the first KPI (for example, the throughput) is affected, namely, the re-estimated value, is 7.56 Mbps. In this case, a first re-estimated impact value of the value that is of the first KPI and that corresponds to the solution in the current network status for the value that is of the first KPI and that corresponds to the second intent target is $(8-7.56)/8\approx5.5\%$.

When the first re-estimated impact value is less than or equal to the threshold, that is, the second preset condition is met, the solution is used as the alternative solution for achieving the first intent. When the first re-estimated impact value is greater than the threshold, that is, the second preset condition is not meet, the solution does not need to be used as the alternative solution for achieving the first intent. For example, the solution may be discarded.

For example, if the first re-estimated impact value is 4.375%, the threshold in the conflict resolution policy information is 12%. Because 4.375% is less than 12%, and the second preset condition is met, the solution may be used as the alternative solution for achieving the first intent.

For another example, if the first re-estimated impact value is 5.5%, the threshold in the conflict resolution policy information is 12%. Because 5.5% is less than 12%, and the second preset condition is met, the solution may be used as the alternative solution for achieving the first intent.

Impact of the second KPI on the value of the first KPI is considered and re-estimation is performed on the value of the first KPI according to the impact re-estimation policy, to obtain the re-estimated value. When the first re-estimated impact value of the re-estimated value for the value that is of the first KPI and that corresponds to the second intent target is less than or equal to the threshold, the solution is used as the alternative solution for achieving the first intent. This can expand a solution selection range, without retranslating an intent to generate the solution and performing conflict detection, thereby reducing a waste of a system resource, and improving execution efficiency of the intent.

It should be noted that, in some embodiments, if the ICR network element and the ID network element are not disposed in the intent providing network element, all steps of interaction between the ICR network element and the ID network element in FIG. 6 are content performed by the intent providing network element. In addition, all steps of interaction between the ID network element, and the knowledge management network element and the data collection coordination function network element are steps of interaction between the intent providing network element, and the knowledge management network element and the data collection coordination function network element.

Optionally, in some embodiments, S421 and S422 may be steps of interaction between the ICR network element and the knowledge management network element. S423 and S424 may be steps of interaction between the ICR network element and the data collection coordination function network element. An execution body of S425 and S426 may be the ICR network element.

Case 3: The conflict resolution policy information indicates only the smallest impact indication policy.

Specifically, the solution with the smallest first impact value in the plurality of solutions is used as the alternative solution for achieving the first intent. For example, a solution for achieving the first intent includes a solution 1, a solution 2, and a solution 3. A first impact value obtained for the solution 1 is 10%, a first impact value obtained for the solution 2 is 5%, and a first impact value obtained for the solution 3 is 3%. In this case, the solution 3 may be directly used as the alternative solution for achieving the first intent.

The solution with the smallest first impact value in the plurality of solutions can be used as the alternative solution based on the conflict resolution policy information sent by the intent consumption network element. This can expand a solution selection range, without retranslating an intent to generate the solution and performing conflict detection, thereby reducing a waste of a system resource, and improving execution efficiency of the intent.

Case 4: The conflict policy information indicates the threshold, the first operation, the impact re-estimation policy, and the second operation.

Specifically, when the first impact value is less than or equal to the threshold, that is, the first preset condition is met, the solution is used as the alternative solution for achieving the first intent. When the first impact value is greater than the threshold, that is, the first preset condition is not met, and when the first re-estimated impact value is less than or equal to the threshold, that is, the second preset condition is met, the solution is used as the alternative solution for achieving the first intent. When the first re-estimated impact value is greater than the threshold, that is, the second preset condition is not meet, the solution does not need to be used as the alternative solution for achieving the first intent. For example, the solution may be discarded.

For obtaining of the first re-estimated impact value, refer to steps S421 to S426. Details are not described herein again.

If a solution in which the first impact value of the value that is of the first KPI and that corresponds to the solution of the first intent for the value that is of the first KPI and that corresponds to the second intent target is less than or equal to the threshold cannot be found in the solution of the first intent, impact of the second KPI on the value of the first KPI can be further considered and re-estimation can be performed on the value of the first KPI according to the impact re-estimation policy, to obtain the re-estimated value. When the first re-estimated impact value of the re-estimated value for the value that is of the first KPI and that corresponds to the second intent target is less than or equal to the threshold, the solution is used as the alternative solution for achieving the first intent. This can expand a solution selection range, without retranslating an intent to generate the solution and performing conflict detection, thereby reducing a waste of a system resource, and improving execution efficiency of the intent.

Case 5: The conflict policy information indicates the threshold, the first operation, and the smallest impact indication policy.

If first impact values corresponding to all solutions of the first intent are all greater than the threshold, that is, the first impact values do not meet the first preset condition, the solution with the smallest first impact value in the plurality of solutions is used as the alternative solution.

For example, if the threshold is 5%, a solution of the first intent includes a solution 1, a solution 2, and a solution 3. A first impact value obtained for the solution 1 is 6%, a first impact value obtained for the solution 1 is 10%, and a first impact value obtained for the solution 3 is 8%. The first impact value corresponding to the solution 1, the first impact value corresponding to the solution 2, and the first impact value corresponding to the solution 3 are all greater than the threshold, that is, the first impact values of all the solutions of the first intent all do not meet the first preset condition. In this case, the solution 1 corresponding to a smallest first impact value may be used as the alternative solution for achieving the first intent.

If a solution in which the first impact value of the value that is of the first KPI and that corresponds to the solution of the first intent for the value that is of the first KPI and that corresponds to the second intent target is less than or equal to the threshold cannot be found in the solution of the first intent, the solution with the smallest first impact value in the plurality of solutions may be used as the alternative solution. This can expand a solution selection range, without retranslating an intent to generate the solution and performing conflict detection, thereby reducing a waste of a system resource, and improving execution efficiency of the intent.

Case 6: The conflict policy information includes the threshold, the first operation, the impact re-estimation policy, the second operation, and the smallest impact indication policy.

Specifically, when the first impact value is less than or equal to the threshold, that is, the first preset condition is met, the solution is used as the alternative solution for achieving the first intent. When the first impact value is greater than the threshold, that is, the first preset condition is not met, and when the first re-estimated impact value is less than or equal to the threshold, that is, the second preset condition is met, the solution is used as the alternative solution for achieving the first intent. When the first re-estimated impact value is greater than the threshold, that is, the second preset condition is not met, the solution with the smallest first re-estimated impact value in the plurality of solutions is used as the alternative solution for achieving the first intent.

For obtaining of the first re-estimated impact value, refer to steps S421 to S426. Details are not described herein again.

If a solution in which the first impact value of the value that is of the first KPI and that corresponds to the solution of the first intent for the value that is of the first KPI and that corresponds to the second intent target is less than or equal to the threshold cannot be found in the solution of the first intent, and further, a solution in which the first re-estimated impact value of the re-estimated value for the value that is of the first KPI and that corresponds to the second intent target is less than or equal to the threshold cannot be found either according to the impact re-estimation policy, the solution with the smallest first re-estimated impact value in the plurality of solutions can be used as the alternative solution. This can expand a solution selection range, without retranslating an intent to generate the solution and performing conflict detection, thereby reducing a waste of a system resource, and improving execution efficiency of the intent.

Optionally, in some embodiments, the conflict resolution policy information may directly indicate the threshold. For example, the conflict resolution policy includes the threshold.

Optionally, in some other embodiments, the conflict resolution policy information may alternatively indirectly indicate the threshold. For example, the conflict resolution policy includes an identifier corresponding to the threshold, and the corresponding threshold may be determined by using the identifier corresponding to the threshold.

A specific form of the identifier corresponding to the threshold is not limited in embodiments of this application. For example, the identifier corresponding to the threshold may be a threshold level.

For example, a threshold corresponding to the threshold level is related to a type of the second intent. In other words, for different types of second intents, thresholds corresponding to a same threshold level may be the same or different. This is not limited in embodiments of this application. For example, for a threshold level of a same level, if the second intent is an energy saving intent, a threshold corresponding to the threshold level may be 15%; or if the second intent is a call drop rate intent, a threshold corresponding to the threshold level may be 1%.

A category of the threshold level is not limited in embodiments of this application.

In an example, the threshold level may include two levels, and levels of the two levels include a high level and a low level.

In another example, the threshold level may include three levels, and levels of the three levels include a high level, a medium, and a low level. For example, the threshold level may include a radical level, a mediocre level, and a conservative level. Levels of the radical level, the mediocre level, and the conservative level are in descending order.

When the category of the threshold level includes a plurality of levels, a higher threshold level indicates a higher threshold corresponding to the threshold level.

In this embodiment, after S410 and before S420, the method 400 may further include S440. To be specific, the intent providing network element determines the corresponding threshold based on the identifier corresponding to the threshold.

The following describes S440 in detail. S440 may include the following steps.

S441: The intent providing network element sends fourth request information to the knowledge management network element. Correspondingly, the knowledge management network element receives the fourth request information sent by the intent providing network element.

The fourth request information is for requesting the threshold corresponding to the threshold level. The fourth request information may include the type of the second intent and the threshold level.

In this case, the knowledge management network element stores a correspondence between one or more intent types, the threshold level, and the threshold.

S442: The knowledge management network element sends, to the intent providing network element, fourth response information for the fourth request information. Correspondingly, the intent providing network element receives the fourth response information sent by the knowledge management network element.

After receiving the fourth response information, the intent providing network element may determine the corresponding threshold.

In some embodiments, the method 400 for resolving an intent conflict provided in this embodiment of this application may further include S450. To be specific, the intent providing network element adjusts the threshold based on the reference information. This can further expand the solution selection range, without retranslating the intent to generate the solution and performing conflict detection, thereby reducing the waste of the system resource, and improving execution efficiency of the intent.

For example, in some embodiments, the reference information may include a real-time margin. The real-time margin is a margin of the second intent target (namely, the target value reached by the second intent) relative to a real-time truth value of the target KPI (namely, the first KPI) corresponding to the second intent in the current network status. In other words, the real-time truth value of the target KPI (namely, the first KPI) corresponding to the second intent in the current network status is less than the second intent target.

The following describes S450 in detail. S450 may include the following steps.

S451: The intent providing network element sends third query information to the data collection coordination function network element. Correspondingly, the data collection coordination function network element receives the third query information sent by the intent providing network element.

The third query information is for requesting to query the real-time margin of the target KPI (namely, the first KPI) corresponding to the second intent in the current network status.

S452: The data collection coordination function network element sends third query response information to the intent providing network element. Correspondingly, the intent providing network element receives the third query response information sent by the data collection coordination function network element.

The third query response information includes the real-time margin of the target KPI (namely, the first KPI) corresponding to the second intent in the current network status.

Specifically, the data collection coordination function network element first needs to determine the real-time margin, then adds the real-time margin to the third query response information, and sends the third query response information to the intent providing network element.

Determining the real-time margin specifically includes: The data collection coordination function network element separately obtains the real-time truth value of the first KPI corresponding to the second intent in the current network status and the target value corresponding to the second intent, and uses, as the real-time margin, a difference obtained by subtracting the real-time truth value of the first KPI corresponding to the second intent in the current network status from the target value corresponding to the second intent.

A manner in which the data collection coordination function network element obtains the real-time truth value of the first KPI corresponding to the second intent in the current network status is not limited in embodiments of this application.

In an example, the data collection coordination function network element may directly obtain the real-time truth value of the first KPI corresponding to the second intent in the current network status.

In another example, the data collection coordination function network element may first obtain parameter information, and obtain, based on the parameter information, the real-time truth value of the first KPI corresponding to the second intent in the current network status. The parameter information indicates a parameter related to determining the real-time truth value of the first KPI corresponding to the second intent.

For example, the data collection coordination function network element may obtain a quantity of users and an average value of rates (for example, service rates or peak rates) of the users in the current network status, and use a product of the quantity of users and the average value of the rates of the users as an actual capacity X' in the current network status. In this case, the quantity of users and the average value of the rates of the users may be considered as the parameter information, and the actual capacity X' in the current network status is the real-time truth value of the first KPI corresponding to the second intent in the current network status.

In addition, if the second intent is to ensure that a maximum capacity is X, and the second intent target is X, a real-time margin of a capacity (namely, the first KPI) corresponding to the second intent is (X-X') in the current network status.

S453: The intent providing network element adaptively adjusts the threshold based on the third query response information.

For example, the threshold may be increased if the second intent is to ensure that the average downlink cell throughput is greater than 8 Mbps, the real-time margin of the target KPI (namely, the first KPI) corresponding to the second intent in the current network status obtained in S452 is 3 Mbps (that is, the real-time truth value of the target KPI corresponding to the second intent in the current network status is 5 Mbps).

For example, in the current network status, a higher real-time margin of the target KPI corresponding to the second intent indicates a higher adjusted threshold. In other words, a larger difference between the target value corresponding to the target KPI corresponding to the second intent and the real-time truth value of the target KPI corresponding to the second intent in the current network status indicates a larger adjusted threshold.

Optionally, in some embodiments, the reference information includes the real-time margin of the target KPI corresponding to the second intent. In addition, the reference information further includes prediction preference information. The prediction preference information indicates a prediction preference for the real-time truth value of the target KPI corresponding to the second intent based on a network status.

For example, the prediction preference may include “no prediction”, short-term prediction, and long-term prediction.

When the prediction preference information indicates “no prediction”, prediction does not need to be performed, based on the network status, on the real-time truth value of the target KPI corresponding to the second intent.

When the prediction preference information indicates short-term prediction, short-term prediction needs to be performed, based on the network status, on the real-time truth value of the target KPI corresponding to the second intent.

When the prediction preference information indicates long-term prediction, long-term prediction needs to be performed, based on the network status, on the real-time truth value of the target KPI corresponding to the second intent.

A short term in short-term prediction and a long term in long-term prediction in embodiments of this application are relative concepts. Prediction whose duration is less than a preset value may be referred to as short-term prediction, or prediction whose duration is greater than or equal to a preset value may be referred to as long-term prediction.

The preset value may be determined based on an actual situation. A specific value of the preset value is not limited in embodiments of this application. For example, the preset value may be 6 hours. To be specific, prediction whose duration is less than six hours is referred to as short-term prediction, and prediction whose duration is greater than or equal to six hours is referred to as long-term prediction.

In this embodiment, S450 may include the following steps.

S454: The intent consumption network element sends the prediction preference information to the intent providing network element. Correspondingly, the intent providing network element receives the prediction preference information sent by the intent consumption network element.

S455: The intent providing network element sends the prediction preference information to the data collection coordination function network element. Correspondingly, the data collection coordination function network element receives the prediction preference information sent by the intent providing network element.

Optionally, in some embodiments, S455 and S451 may be implemented in one step. To be specific, the intent providing network element may add the prediction preference information and the third query information in S451 to a same message, and send the message to the data collection coordination function network element.

If the prediction preference information indicates short-term prediction or long-term prediction, between S451 and S452, the data collection coordination function network element first obtains historical data of real-time truth values of the target KPI corresponding to the second intent in different network statuses, performs, based on historical data, short-term prediction or long-term prediction on the real-time truth value of the target KPI corresponding to the second intent, and obtains the real-time margin based on the real-time truth value of the target KPI corresponding to the second intent obtained after short-term prediction or long-term prediction and the target value corresponding to the target KPI corresponding to the second intent. In this case, the knowledge management network element stores the historical data of the real-time truth values of the target KPI corresponding to the second intent in the different network statuses.

A manner in which the data collection coordination function network element obtains the historical data of the real-time truth values of the target KPI corresponding to the second intent in the different network statuses is not limited in embodiments of this application.

In an example, the knowledge management network element may store the historical data of the real-time truth values of the target KPI corresponding to the second intent in the different network statuses. The data collection coordination function network element may directly obtain, from the knowledge management network element, the historical data of the real-time truth values of the target KPI corresponding to the second intent in the different network statuses.

In another example, the knowledge management network element may store historical data of the parameter information in the different network statuses. The parameter information indicates a parameter related to determining the real-time truth value of the target KPI corresponding to the second intent. The data collection coordination function network element first obtains historical data of the parameter information in the different network statuses from the knowledge management network element, and obtains, based on the historical data of the parameter information in the different network statuses, the historical data of the real-time truth values of the target KPI corresponding to the second intent in the different network statuses.

In this case, the real-time margin included in the third query response information in S452 is the real-time margin obtained based on the prediction preference information. In an example, S450 may be performed after S420. In this case, regardless of whether the alternative solution for achieving the first intent is found in S420, S450 may be performed. Certainly, to reduce an intent conflict resolution procedure and avoid unnecessary signaling overheads, in some embodiments, S450 may alternatively be performed only when no alternative solution for achieving the first intent is found in S420.

In another example, S450 may be performed after S410 and before S420. In this case, if S410 is performed after S430, S450 is performed after S410. If S410 is performed before S430, S450 is performed after S410 or S430.

It should be understood that S440 is performed before S450.

Figure 8:
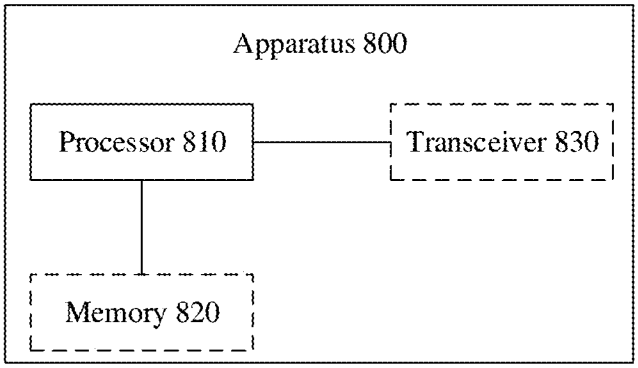

With reference to FIG. 4 to FIG. 6, the foregoing describes the method for resolving an intent conflict provided in embodiments of this application. With reference to FIG. 7 and FIG. 8, the following describes an apparatus for resolving an intent conflict provided in embodiments of this application.

FIG. 7 and FIG. 8 are diagrams of structures of possible apparatuses for resolving an intent conflict according to embodiments of this application. These communication apparatuses may be configured to implement the functions of the intent providing network element in the foregoing method embodiments, and therefore can also achieve the beneficial effects of the foregoing method embodiments.

In embodiments of this application, the apparatus for resolving an intent conflict may be an intent providing network element, or may be a module (for example, a chip) used in an intent providing network element.

For example, more specifically, the method may be performed by an ID/IE network element or an ICR network element in the intent providing network element, or may be performed by a chip or a circuit in an ID/IE network element or an ICR network element.

FIG. 7 is a block diagram of an apparatus 700 for resolving an intent conflict according to an embodiment of this application. The apparatus 700 includes a transceiver unit 710. Optionally, the apparatus 700 may further include a processing unit 720. The transceiver unit 710 may communicate with the outside, and the processing unit 720 is configured to perform data processing. The transceiver unit 710 may also be referred to as a communication interface or a communication unit.

Optionally, the apparatus 700 may further include a storage unit. The storage unit may be configured to store instructions and/or data. The processing unit 720 may read the instruction and/or the data in the storage unit.

The apparatus 700 may be configured to perform the actions performed by the intent providing network element (or the ID/IE network element in the intent providing network element) in the foregoing method embodiments. In this case, the apparatus 700 may be an intent providing network element (or an ID/IE network element in an intent providing network element) or a component that may be disposed in an intent providing network element (or an ID/IE network element in an intent providing network element). The transceiver unit 710 is configured to perform receiving and sending-related operations on the side of the intent providing network element (or the ID/IE network element in the intent providing network element) in the foregoing method embodiments. The processing unit 720 is configured to perform processing-related operations on the side of the intent providing network element (or the ID/IE network element in the intent providing network element) in the foregoing method embodiments.

For example, in an implementation, the transceiver unit 710 is configured to receive conflict resolution policy information sent by an intent consumption network element. The conflict resolution policy information indicates that a threshold and a first operation are included. The first operation includes: when a first preset condition is met, using a solution as an alternative solution for achieving a first intent. The first preset condition includes that a first impact value of a value that is of a first KPI and that corresponds to the solution for a value that is of the first KPI and that corresponds to a second intent target is less than or equal to the threshold. The processing unit 720 is configured to perform conflict resolution on the solution based on the conflict resolution policy information.

Optionally, the conflict resolution policy information further includes an impact re-estimation policy and a second operation. The impact re-estimation policy indicates a policy of performing re-estimation on the first impact value. The second operation includes: when the first preset condition is not met, performing, based on a second KPI, re-estimation on the value that is of the first KPI and that corresponds to the solution, to obtain a re-estimated value, and when a second preset condition is met, using the solution as the alternative solution. The second preset condition includes that a first re-estimated impact value of the re-estimated value for the value that is of the first KPI and that corresponds to the second intent target is less than or equal to the threshold. The second KPI is a KPI that affects a value of the first KPI.

Optionally, the transceiver unit 710 is further configured to: send first request information to a knowledge management network element, where the first request information is for requesting a second impact value of the second KPI for the value that is of the first KPI and that corresponds to the solution; and receive first response information that is sent by the knowledge management network element for the first request information, where the first response information indicates a plurality of mapping relationships, and the mapping relationships include a mapping relationship between a value corresponding to the second KPI and a plurality of second impact values. The performing, based on a second KPI, re-estimation on the value that is of the first KPI and that corresponds to the solution, to obtain a re-estimated value includes: performing, based on the plurality of mapping relationships and a truth value corresponding to the second KPI and according to the impact re-estimation policy, re-estimation on the value that is of the first KPI and that corresponds to the solution, to obtain the re-estimated value, where the truth value corresponding to the second KPI is a value corresponding to the second KPI in a current network status.

Optionally, the transceiver unit 710 is further configured to: send second request information to a data collection coordination function network element, where the second request information is for requesting the truth value corresponding to the second KPI; and receive second response information that is sent by the data collection coordination function network element for the second request information, where the second response information indicates the truth value corresponding to the second KPI.

Optionally, the impact re-estimation policy includes a downward re-estimation policy or an interpolation re-estimation policy. The downward re-estimation policy is re-estimation in a direction in which impact on a first intent target and the second intent target is small. A first intent target indicates a target value reached by the first intent. The interpolation re-estimation policy is re-estimation based on an interpolation method.

Optionally, the conflict resolution policy information further includes a smallest impact indication policy. The smallest impact indication policy includes: When the second preset condition is not met, a solution with a smallest first re-estimated impact value in a plurality of solutions is used as the alternative solution.

Optionally, the conflict resolution policy information further includes a smallest impact indication policy. The smallest impact indication policy includes: When the first preset condition is not met, a solution with a smallest first impact value in a plurality of solutions is used as the alternative solution.

Optionally, the processing unit 720 is configured to determine that the intent conflict occurs. The transceiver unit 710 is further configured to send third request information to the intent consumption network element. The third request information is for requesting the conflict resolution policy information.

Optionally, the processing unit 720 is configured to adjust the threshold based on reference information. The reference information includes a real-time margin of the first KPI. The real-time margin is a margin of the second intent target relative to a real-time truth value of the first KPI corresponding to the second intent in the current network status.

Optionally, the transceiver unit 710 is further configured to: send third query information to the data collection coordination function network element, where the third query information is for requesting to query the real-time margin; and receive third query response information sent by the data collection coordination function network element, where the third query response information indicates the real-time margin.

Optionally, a larger real-time margin indicates a higher adjusted threshold; and/or the real-time margin is determined based on the real-time truth value of the first KPI corresponding to the second intent in the current network status and a target value corresponding to the second intent, or the real-time margin is determined based on the real-time truth value of the first KPI corresponding to the second intent in the current network status, the second intent target, and a prediction preference, and the prediction preference is a prediction preference for a real-time truth value of the first KPI.

For example, in another implementation, the transceiver unit 710 is configured to receive conflict resolution policy information sent by an intent consumption network element. The conflict resolution policy information indicates that a threshold, an impact re-estimation policy, and a second operation. The processing unit 720 is configured to perform conflict resolution on a solution based on the conflict resolution policy information. The impact re-estimation policy indicates a policy of performing re-estimation on a first impact value. The first impact value is an impact value of a value that is of a first KPI and that corresponds to the solution for a value that is of the first KPI and that corresponds to a second intent target. The second operation includes: performing, based on a second KPI, re-estimation on the value that is of the first KPI and that corresponds to the solution, to obtain a re-estimated value, and when a second preset condition is met, using the solution as an alternative solution of a first intent. The second preset condition includes that a first re-estimated impact value of the re-estimated value for the value that is of the first KPI and that corresponds to the second intent target is less than or equal to the threshold. The second KPI is a KPI related to a network status.

Optionally, the transceiver unit 710 is further configured to: send first request information to a knowledge management network element, where the first request information is for requesting a second impact value of the second KPI for the value that is of the first KPI and that corresponds to the solution; and receive first response information that is sent by the knowledge management network element for the first request information, where the first response information indicates a plurality of mapping relationships, and the mapping relationships include a mapping relationship between a value corresponding to the second KPI and a plurality of second impact values. The performing, based on a second KPI, re-estimation on the value that is of the first KPI and that corresponds to the solution, to obtain a re-estimated value includes: performing, based on the plurality of mapping relationships and a truth value corresponding to the second KPI and according to the impact re-estimation policy, re-estimation on the value that is of the first KPI and that corresponds to the solution, to obtain the re-estimated value, where the truth value corresponding to the second KPI is a value corresponding to the second KPI in a current network status.

Optionally, the transceiver unit 710 is further configured to: send second request information to a data collection coordination function network element, where the second request information is for requesting the truth value corresponding to the second KPI; and receive second response information that is sent by the data collection coordination function network element for the second request information, where the second response information indicates the truth value corresponding to the second KPI.

Optionally, the impact re-estimation policy includes a downward re-estimation policy or an interpolation re-estimation policy. The downward re-estimation policy is re-estimation in a direction in which impact on a first intent target and the second intent target is small. A first intent target indicates a target value reached by the first intent. The interpolation re-estimation policy is re-estimation based on an interpolation method.

Optionally, the conflict resolution policy information further includes a smallest impact indication policy. The smallest impact indication policy includes: When the second preset condition is not met, a solution with a smallest first re-estimated impact value in a plurality of solutions is used as the alternative solution.

Optionally, the processing unit 720 is configured to determine that the intent conflict occurs. The transceiver unit 710 is further configured to send third request information to the intent consumption network element. The third request information is for requesting the conflict resolution policy information.

Optionally, the processing unit 720 is configured to adjust the threshold based on reference information. The reference information includes a real-time margin of the first KPI. The real-time margin is a margin of the second intent target relative to a real-time truth value of the first KPI corresponding to the second intent in the current network status.

Optionally, the transceiver unit 710 is further configured to: send third query information to the data collection coordination function network element, where the third query information is for requesting to query the real-time margin; and receive third query response information sent by the data collection coordination function network element, where the third query response information indicates the real-time margin.

Optionally, a larger real-time margin indicates a higher adjusted threshold; and/or the real-time margin is determined based on the real-time truth value of the first KPI corresponding to the second intent in the current network status and a target value corresponding to the second intent, or the real-time margin is determined based on the real-time truth value of the first KPI corresponding to the second intent in the current network status, the second intent target, and a prediction preference, and the prediction preference is a prediction preference for a real-time truth value of the first KPI.

For example, in still another implementation, the transceiver unit 710 is configured to receive conflict resolution policy information sent by an intent consumption network element. The conflict resolution policy information indicates to use a solution with a smallest first impact value in a plurality of solutions as an alternative solution for achieving a first intent. The first impact value is an impact value of a value that is of a first KPI and that corresponds to the solution for a value that is of the first KPI and that corresponds to a second intent target. The processing unit 720 is configured to perform conflict resolution on the solution based on the conflict resolution policy information.

Optionally, the processing unit 720 is configured to determine that the intent conflict occurs. The transceiver unit 710 is further configured to send third request information to the intent consumption network element. The third request information is for requesting the conflict resolution policy information.

As shown in FIG. 8, an embodiment of this application further provides an apparatus 800 for resolving an intent conflict. The apparatus 800 for resolving an intent conflict includes a processor 810. The processor 810 is coupled to the memory 820. The memory 820 is configured to store a computer program or instructions and/or data. The processor 810 is configured to execute the computer program or the instructions and/or the data stored in the memory 820, to perform the methods in the foregoing method embodiments.

Optionally, the apparatus 800 for resolving an intent conflict includes one or more processors 810.

Optionally, as shown in FIG. 8, the apparatus 800 for resolving an intent conflict may further include a memory 820.

Optionally, the apparatus 800 for resolving an intent conflict may include one or more memories 820.

Optionally, the memory 820 and the processor 810 may be integrated or separately disposed.

Optionally, as shown in FIG. 8, the apparatus 800 for resolving an intent conflict may further include a transceiver 830. The transceiver 830 is configured to receive a signal and/or send a signal. For example, the processor 810 is configured to control the transceiver 1230 to receive the signal and/or send the signal.

In a solution, the apparatus 800 for resolving an intent conflict is configured to implement the operations performed by the intent providing network element (or the ID/IE network element in the intent providing network element) in the foregoing method embodiments.

For example, the processor 810 is configured to implement processing-related operations performed by the intent providing network element (or the ID/IE network element in the intent providing network element) in the foregoing method embodiments. The transceiver 830 is configured to implement receiving and sending-related operations performed by the intent providing network element (or the ID/IE network element in the intent providing network element) in the foregoing method embodiments.

An embodiment of this application further provides a computer-readable storage medium. The computer-readable storage medium stores a computer program for implementing the method performed by the intent providing network element (or the ID/IE network element in the intent providing network element) in the foregoing method embodiments.

For example, when the computer program is executed by a computer, the computer is enabled to implement the method performed by the intent providing network element (or the ID/IE network element in the intent providing network element) in the foregoing method embodiments.

An embodiment of this application further provides a computer program product including instructions. When the instructions are executed by a computer, the computer is enabled to implement the method performed by the intent providing network element (or the ID/IE network element in the intent providing network element) in the foregoing method embodiments.

An embodiment of this application further provides a communication system. The communication system includes an intent providing network element and an intent consumption network element.

In an example, the communication system includes the intent providing network element (or the ID/IE network element in the intent providing network element) and the intent consumption network element in the foregoing embodiments.

A specific structure of an execution body of the method provided in embodiments of this application is not particularly limited in embodiments of this application, provided that a program that records code of the method provided in embodiments of this application can be run to perform communication according to the method provided in embodiments of this application. For example, the method provided in embodiments of this application may be executed by an intent providing network element (or an ID/IE network element in an intent providing network element), or a functional module that is in an intent providing network element (or an ID/IE network element in the intent providing network element) and that can invoke and execute the program.

In embodiments of this application, unless otherwise specified or there is a logic conflict, terms and/or descriptions between different embodiments are consistent and may be mutually referenced, and technical features in different embodiments may be combined based on an internal logical relationship thereof, to form a new embodiment.

It should be understood that, in embodiments of this application, numbers "first", "second", and the like are merely for distinguishing between different objects, for example, for distinguishing between different network devices, and do not constitute a limitation on the scope of embodiments of this application. Embodiments of this application are not limited thereto.

It should be further understood that, in this application, "in a case . . . ", "when . . . ", and "if" all mean that a network element performs corresponding processing in an objective situation, and are not intended to limit time, do not mean that the network element is required to have a determining action during implementation, and do not mean any other limitation.

It should be further understood that, in embodiments of this application, "B corresponding to A" indicates that B is associated with A, and B may be determined based on A. However, it should be further understood that determining B based on A does not mean that B is determined only based on A. B may alternatively be determined based on A and/or other information.

It should be further understood that the term "and/or" in this specification describes only an association relationship between associated objects and indicates that three relationships may exist. For example, A and/or B may indicate the following three cases: Only A exists, both A and B exist, and only B exists. In addition, the character "/" in this specification generally indicates an "or" relationship between associated objects.

Unless otherwise specified, an expression in this application similar to an expression that "an item includes one or more of the following: A, B, and C" usually means that the item may be any one of the following: A; B; C; A and B; A and C; B and C; A, B, and C; A and A; A, A, and A; A, A, and B; A, A, and C; A, B, and B; A, C, and C; B and B; B, B, and B; B, B, and C; C and C; C, C, and C; and another combination of A, B and C. In the foregoing descriptions, three elements A, B, and C are used as an example to describe an optional case of the item. When an expression is "an item includes at least one of the following: A, B, . . . , and X", in other words, more elements are included in the expression, a case to which the item is applicable may also be obtained according to the foregoing rule.

It may be understood that various numbers in embodiments of this application are merely used for differentiation for ease of description, and are not used to limit the scope of embodiments of this application. Sequence numbers of the foregoing processes do not mean an execution sequence, and the execution sequence of the processes should be determined based on functions and internal logic of the processes.

A person of ordinary skill in the art may be aware that units and algorithm steps in the examples described with reference to embodiments disclosed in this specification can be implemented by electronic hardware or a combination of computer software and electronic hardware. Whether these functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for convenience and brevity of description, for a detailed working process of the foregoing system, apparatus, and unit, refer to a corresponding process in the foregoing method embodiment. Details are not described herein again.

In the several embodiments provided in this application, it should be understood that the disclosed systems, apparatuses, and methods may be implemented in other manners. For example, the described apparatus embodiments are merely examples. For example, division into the units is merely logical function division, and may be other division during actual implementation. For example, a plurality of units or components may be combined or integrated into another system, or some features may be ignored or not performed. In addition, the displayed or discussed mutual couplings, direct couplings, or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes any medium that can store program code, for example, a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:

receiving, by an intent providing network device or a chip in an intent providing network device, conflict resolution policy information sent by an intent consumption network element, wherein the conflict resolution policy information indicates a threshold and a first operation, wherein an intent conflict comprises that a solution of a first intent affects a first key performance indicator (KPI) corresponding to a second intent target, the second intent target indicates a target value reached by a second intent, and the first operation comprises: when a first preset condition is met, using the solution as an alternative solution for achieving the first intent, wherein the first preset condition comprises that a first impact value of a value that is of the first KPI and that corresponds to the solution on a value that is of the first KPI and that corresponds to the second intent target is less than or equal to the threshold; and performing conflict resolution on the solution based on the conflict resolution policy information.

2. The method according to claim 1, wherein the conflict resolution policy information further comprises an impact re-estimation policy and a second operation;

wherein the impact re-estimation policy indicates a policy of performing re-estimation on the first impact value; and wherein the second operation comprises:

when the first preset condition is not met, performing, based on a second KPI, re-estimation on the value that is of the first KPI and that corresponds to the solution, to obtain a re-estimated value, and when a second preset condition is met, using the solution as the alternative solution, wherein the second preset condition comprises that a first re-estimated impact value of the re-estimated value for the value that is of the first KPI and that corresponds to the second intent target is less than or equal to the threshold, and the second KPI is a KPI that affects a value of the first KPI.

3. The method according to claim 2, further comprising:

sending first request information to a knowledge management network element, wherein the first request information requests a second impact value of the second KPI for the value that is of the first KPI and that corresponds to the solution;

receiving first response information that is sent by the knowledge management network element for the first request information, wherein the first response information indicates a plurality of mapping relationships, and each mapping relationship of the plurality of mapping relationships comprises a mapping relationship between a value corresponding to the second KPI and each of a plurality of second impact values; and wherein performing, based on the second KPI, re-estimation on the value that is of the first KPI and that corresponds to the solution, to obtain the re-estimated value comprises:

performing, based on the plurality of mapping relationships and a truth value corresponding to the second KPI and according to the impact re-estimation policy, re-estimation on the value that is of the first KPI and that corresponds to the solution, to obtain the re-estimated value, wherein the truth value corresponding to the second KPI is a value corresponding to the second KPI in a current network status.

4. The method according to claim 3, further comprising:

sending second request information to a data collection coordination function network element, wherein the second request information requests the truth value corresponding to the second KPI; and receiving second response information that is sent by the data collection coordination function network element for the second request information, wherein the second response information indicates the truth value corresponding to the second KPI.

5. The method according to claim 2, wherein:

the impact re-estimation policy comprises a downward re-estimation policy or an interpolation re-estimation policy;

the downward re-estimation policy is re-estimation in a direction in which impact on the second intent target is minimized, and a first intent target indicates a target value reached by the first intent; and the interpolation re-estimation policy is re-estimation based on an interpolation method.

6. The method according to claim 2, wherein the conflict resolution policy information further comprises a smallest impact indication policy, and the smallest impact indication policy comprises: when the second preset condition is not met, a solution with a smallest first re-estimated impact value in a plurality of solutions is used as the alternative solution.

7. The method according to claim 1, wherein the conflict resolution policy information further comprises a smallest impact indication policy, and the smallest impact indication policy comprises: when the first preset condition is not met, a solution with a smallest first impact value in a plurality of solutions is used as the alternative solution.

8. The method according to claim 1, further comprising:

determining that the intent conflict occurs; and sending third request information to the intent consumption network element, wherein the third request information requests the conflict resolution policy information.

9. A method, comprising:

receiving, by an intent providing network device or a chip in an intent providing network device, conflict resolution policy information sent by an intent consumption network element, wherein the conflict resolution policy information comprises a threshold, an impact re-estimation policy, and a second operation, and wherein an intent conflict comprises that a solution of a first intent affects a first key performance indicator (KPI) corresponding to a second intent target, the second intent target indicates a target value reached by a second intent; and performing conflict resolution on the solution based on the conflict resolution policy information;

wherein the impact re-estimation policy indicates a policy of performing re-estimation on a first impact value, and the first impact value is an impact value of a value that is of the first KPI and that corresponds to the solution on a value that is of the first KPI and that corresponds to the second intent target; and wherein the second operation comprises: performing, based on a second KPI, re-estimation on the value that is of the first KPI and that corresponds to the solution, to obtain a re-estimated value, and when a second preset condition is met, using the solution as an alternative solution of the first intent, wherein the second preset condition comprises that a first re-estimated impact value of the re-estimated value for the value that is of the first KPI and that corresponds to the second intent target is less than or equal to the threshold, and the second KPI is a KPI related to a network status.

10. The method according to claim 9, further comprising:

sending first request information to a knowledge management network element, wherein the first request information requests a second impact value of the second KPI for the value that is of the first KPI and that corresponds to the solution;

receiving first response information that is sent by the knowledge management network element for the first request information, wherein the first response information indicates a plurality of mapping relationships, and each of the plurality of mapping relationships comprises a mapping relationship between a value corresponding to the second KPI and a plurality of second impact values; and wherein performing, based on the second KPI, re-estimation on the value that is of the first KPI and that corresponds to the solution, to obtain the re-estimated value comprises:

performing, based on the plurality of mapping relationships and a truth value corresponding to the second KPI and according to the impact re-estimation policy, re-estimation on the value that is of the first KPI and that corresponds to the solution, to obtain the re-estimated value, wherein the truth value corresponding to the second KPI is a value corresponding to the second KPI in a current network status.

11. The method according to claim 10, further comprising:

sending second request information to a data collection coordination function network element, wherein the second request information requests the truth value corresponding to the second KPI; and receiving second response information that is sent by the data collection coordination function network element for the second request information, wherein the second response information indicates the truth value corresponding to the second KPI.

12. The method according to claim 9, wherein:

the impact re-estimation policy comprises a downward re-estimation policy or an interpolation re-estimation policy;

the downward re-estimation policy is re-estimation in a direction in which impact on the second intent target is minimized, and a first intent target indicates a target value reached by the first intent; and the interpolation re-estimation policy is re-estimation based on an interpolation method.

13. The method according to claim 9, wherein the conflict resolution policy information further comprises a smallest impact indication policy, and the smallest impact indication policy comprises: when the second preset condition is not met, a solution with a smallest first re-estimated impact value in a plurality of solutions is used as the alternative solution.

14. The method according to claim 9, further comprising: determining that the intent conflict occurs; and sending third request information to the intent consumption network element, wherein the third request information requests the conflict resolution policy information.

15. The method according to claim 9, further comprising: adjusting the threshold based on reference information, wherein the reference information comprises a real-time margin, and the real-time margin is a margin of the second intent target relative to a real-time truth value of the first KPI corresponding to the second intent in a current network status.

16. The method according to claim 15, further comprising:

sending third query information to a data collection coordination function network element, wherein the third query information requests to query the real-time margin; and receiving third query response information sent by the data collection coordination function network element, wherein the third query response information indicates the real-time margin.

17. The method according to claim 15, wherein:

a larger real-time margin indicates a higher adjusted threshold; or the real-time margin is determined based on the real-time truth value of the first KPI corresponding to the second intent in the current network status and the target value corresponding to the second intent, or the real-time margin is determined based on the real-time truth value of the first KPI corresponding to the second intent in the current network status, the second intent target, and a prediction preference, and the prediction preference is a prediction preference for a real-time truth value of the first KPI.

18. An apparatus, comprising at least one processor, wherein the at least one processor is configured to execute a computer program stored in a memory, enabling the apparatus to implement:

receiving conflict resolution policy information sent by an intent consumption network element, wherein the conflict resolution policy information indicates a threshold and a first operation, wherein an intent conflict comprises that a solution of a first intent affects a first key performance indicator (KPI) corresponding to a second intent target, the second intent target indicates a target value reached by a second intent, and the first operation comprises: when a first preset condition is met, using the solution as an alternative solution for achieving the first intent, wherein the first preset condition comprises that a first impact value of a value that is of the first KPI and that corresponds to the solution on a value that is of the first KPI and that corresponds to the second intent target is less than or equal to the threshold; and performing conflict resolution on the solution based on the conflict resolution policy information.

19. The apparatus according to claim 18, wherein the conflict resolution policy information further comprises an impact re-estimation policy and a second operation;

wherein the impact re-estimation policy indicates a policy of performing re-estimation on the first impact value; and wherein the second operation comprises:

when the first preset condition is not met, performing, based on a second KPI, re-estimation on the value that is of the first KPI and that corresponds to the solution, to obtain a re-estimated value, and when a second preset condition is met, using the solution as the alternative solution, wherein the second preset condition comprises that a first re-estimated impact value of the re-estimated value for the value that is of the first KPI and that corresponds to the second intent target is less than or equal to the threshold, and the second KPI is a KPI that affects a value of the first KPI.

20. The apparatus according to claim 19, wherein the at least one processor executing the computer program stored in the memory further enables the apparatus to implement:

sending first request information to a knowledge management network element, wherein the first request information requests a second impact value of the second KPI for the value that is of the first KPI and that corresponds to the solution;

receiving first response information that is sent by the knowledge management network element for the first request information, wherein the first response information indicates a plurality of mapping relationships, and each mapping relationship of the plurality of mapping relationships comprises a mapping relationship between a value corresponding to the second KPI and each of a plurality of second impact values; and wherein performing, based on the second KPI, re-estimation on the value that is of the first KPI and that corresponds to the solution, to obtain the re-estimated value comprises:

performing, based on the plurality of mapping relationships and a truth value corresponding to the second KPI and according to the impact re-estimation policy, re-estimation on the value that is of the first KPI and that corresponds to the solution, to obtain the re-estimated value, wherein the truth value corresponding to the second KPI is a value corresponding to the second KPI in a current network status.

* * * * *